United States Patent [19]
Ban et al.

[11] Patent Number: 5,961,931
[45] Date of Patent: Oct. 5, 1999

[54] PARTICULATE TRAP

[75] Inventors: Syunsuke Ban; Tomohiko Ihara; Yoichi Nagai, all of Itami; Kiyoshi Kobashi, Mishima; Hiromichi Yanagihara, Gotenba, all of Japan

[73] Assignee: Sumitomo Electric Industries, Ltd., Osaka, Japan

[21] Appl. No.: 08/542,625

[22] Filed: Oct. 13, 1995

[30] Foreign Application Priority Data

Oct. 13, 1994 [JP] Japan ..................................... 6-247817
Jan. 13, 1995 [JP] Japan ..................................... 7-004166

[51] Int. Cl.$^6$ .................................................. B01D 50/00
[52] U.S. Cl. .......................... 422/171; 422/176; 422/179; 422/180; 422/181; 55/484; 55/521; 55/524; 55/525; 55/322
[58] Field of Search .................................... 422/171, 176, 422/179, 180, 181; 55/484, 521, 524, 525, 322; 60/272, 274, 282, 299

[56] References Cited

U.S. PATENT DOCUMENTS

| | | | |
|---|---|---|---|
| 5,089,237 | 2/1992 | Schuster et al. ........................ | 422/180 |
| 5,098,670 | 3/1992 | Haerle ..................................... | 422/180 |
| 5,171,341 | 12/1992 | Merry ....................................... | 55/484 |
| 5,174,969 | 12/1992 | Fischer et al. .......................... | 422/180 |
| 5,228,891 | 7/1993 | Adiletta ................................... | 55/484 |
| 5,356,598 | 10/1994 | Boubehira et al. ..................... | 422/180 |

*Primary Examiner*—Christopher Kim
*Attorney, Agent, or Firm*—Wenderoth, Lind & Ponack

[57] ABSTRACT

A particulate trap for use with a diesel engine is high in particulate trapping capacity and regenerating capacity and low in pressure drop, and yet is compact and inexpensive. This trap has a filter element made up of a plurality of tapered filter members formed from a fabric of heat-resistant metal fibers. The filter members have different diameters from each other and are nested concentrically one inside the other so that the adjacent filter members are positioned inversely. Each filter member is connected at its large-diameter end to the small-diameter end of the immediately outer filter member to alternately close the exhaust inlet and outlet ends of the gaps between the adjacent filter members. The filter element thus formed is mounted in a metal case provided in an exhaust line and used as a particulate trap. With this arrangement, it is possible to increase the particulate trapping area of the filter and the exhaust inlet openings without increasing the size of the entire trap. Such a trap is less likely to suffer pressure drop and is highly durable.

4 Claims, 24 Drawing Sheets

100  1(11)  101

PARTICULATE TRAP

BACKGROUND OF THE INVENTION

The present invention relates to a particulate trap for trapping and removing particulates such as carbon and other noxious components contained in exhausts from a diesel engine.

Emissions from automotive engines are a leading cause of air pollution. It is therefore extremely important to develop a technique for removing noxious components contained in exhausts.

Exhausts from diesel engines are especially problematic because they contain mainly NOx and carbon particulates. Efforts are now being made to develop a technique for effectively removing such particulates from exhausts.

Trials have been made to remove noxious components from exhausts before exhausts leave the engine by Exhaust Gas Recycling (EGIR), or by improving fuel injectors. But none of these are decisive solutions. Now, it is considered more practical and effective to remove such noxious components from exhausts by means of a particulate trap after they leave the engine (as proposed in Unexamined Japanese Patent Publication 58-51235).

A particulate trap for trapping particulates contained in exhausts from a diesel engine has to satisfy the following requirements.

① Particulate Trapping Efficiency

First, it is important that such a trap be capable of trapping particulates with high efficiency. Namely, such a trap has to be capable of trapping at least 60% of the particulates contained in exhausts from a diesel engine, though depending on their amount discharged and the load applied.

Of these particulates, small-diameter (2 μm or less) suspended particulate matter (SPM) can reportedly trigger human lung cancers. Thus, it is especially important to trap such suspended particulate matter.

② Pressure Drop

A second important requirement is that the trap can trap particulates with minimum pressure drop. The pressure drop when the exhausts pass through the trap tends to increase with the amount of particulates collected in the trap. If the pressure drop is too high, the engine performance may be hampered due to increased back pressure. Thus, it is considered necessary to keep the pressure drop below 30 Kpa. For this purpose, the particulate trap has to be capable of keeping the pressure drop at a sufficiently low level not only at the beginning of use but even after a large amount of particulates have been collected in the trap.

③ Regenerating Capability

A third requirement is that such a trap can be regenerated at a low energy cost. In order to use the particulate trap for a long period of time, it has to be regenerated periodically by burning trapped particulates. Heretofore, electric heaters and light oil burners were used to burn particulates.

④ Durability

The particulate trap has to be durable enough. Since it is exposed to high-temperature exhausts, it has to be highly corrosion-resistant. Also, it has to be capable of withstanding repeated heat shocks when burning particulates to regenerate.

⑤ Combininability with a Catalytic Converter

Some of today's cars have a catalytic converter carrying a catalyst for removing noxious gas components and mounted in an exhaust line of the engine. In such a case, both a particulate trap and a catalytic converter have to be mounted in the exhaust line. If they are separate members, they would require a larger installation space in the exhaust line, which is usually not available, as well as a higher installation cost. Thus, it is desirable to combine these member into an integral one-piece unit.

Among conventional filter elements of the above-described type, a wall-flow type, honeycomb-like porous filter element made of cordierite ceramic has been considered nearest-to-practical filters. But this filter element has some problems. One problem is that particulates tend to collect locally. Another problem is that due to its low heat conductivity, heat spots tend to develop during regeneration, so that the filter tends to melt and be damaged, or cracked due to thermal stress. Its durability is thus insufficient. Recently, a ceramic fiber trap formed by bundling ceramic fibers into a candle shape attracted much attention. This trap has, however, a problem in that its fibers tend to be destroyed due to decreased strength when exposed to high-temperature exhausts. Its durability is thus not sufficiently high either.

A metallic trap is now considered promising as a reliable, practical particulate trap because it is free of cracks during regeneration. But this trap cannot satisfy the above requirements ① and ②, though it meets the requirements ③ and ④. Namely, if the holes of the filter are made small in an attempt to increase the particulate trapping efficiency, particulates tend to be trapped only on the surface of the filter, so that it will soon get clogged with particulates, increasing the pressure drop and shortening the life of the filter.

A wall-flow type, honeycomb-like porous member made of cordierite ceramic, which has been developed for use as a diesel particulate filter, has the following problems.

(1) Because of its low thermal conductivity, the filter cannot be heated uniformly during regeneration. Rather, heat spots tend to develop in the filter during regeneration. Due to such heat spots, the filter may partially melt, or develop cracks due to thermal stress. Its durability is thus unsatisfactory.

(2) Since the inlet openings of the filter have a square section, heat produced by burning particulates during regeneration cannot dissipate efficiently. Rather, heat tends to concentrate on the corners of the square section. The filter is thus easily damaged or destroyed. Namely, its durability is poor.

(3) This honeycomb-like porous member has many square openings whose inlet and outlet ends are alternately plugged. Such plugging increases the flow resistance, so that the pressure drop is high at an initial stage.

(4) The exhaust inlet opening is so small in area that it can be easily clogged with particulates. Thus, the pressure drop tends to increase markedly even while the amount of particulates trapped is still small.

(5) In order to trap suspended particulate matter (SPN) having particle diameters not exceeding 2 μm, the diameter of the filter holes have to be made small. Such small filter holes will, however, make the pressure drop even higher.

(6) If the filter carries a catalyst, high heat capacity of the honeycomb porous member may make it difficult to heat the catalyst quickly to a sufficiently high temperature to activate it.

In contrast, a metallic trap is sufficiently high in thermal conductivity, so that crack-causing heat spots are difficult to develop during regeneration. Namely, such a metallic trap can be regenerated without the possibility of reduced durability. But if the filter is designed such that it can trap particulates with sufficiently high efficiency, particulates tend to be trapped only on the surface of the filter, so that it will soon be clogged with particulates. This leads to the shortening of filter life. Namely, conventional metallic traps cannot satisfy the second requirement.

A metallic trap that satisfies the second requirement would be one whose filter elements have a sufficiently large surface area through which exhausts pass (filtering area). But in order to increase the surface area (filtering area) of the filter elements in a conventional metallic trap, the size of the entire trap would have to be substantially increased. By welding filters to side plates with high accuracy, it will be possible to reduce the gaps between the filters and thus save the mounting space of the entire trap. But such accurate welding will lead to lower mass-productivity and higher manufacturing cost.

The particulate trap according to the present invention is made of a metal, so that it has none of the abovementioned problems of wall-flow type, honeycomb-like cordierite ceramic porous traps. Also, it is compact and nevertheless the surface area of its filter element is large, so that it has none of the problems of conventional metal traps, either. Alumina whiskers are provided on the surface of the filter material to catch suspended particulate matter (SPN). By carrying a catalyst on this metal trap, this device can be used both as particulate trap and a catalytic converter.

SUMMARY OF THE INVENTION

According to the present invention, there is provided a particulate trap for use with a diesel engine comprising a filter element provided in an exhaust line of the diesel engine. The filter element comprises a plurality of flat plate-shaped filter members that are made of an unwoven web of metal fiber and arranged parallel to each other to provide gaps between the adjacent filter members through which exhaust from the diesel engine passes. Alternate ones of the gaps are closed at an exhaust inlet end, while the remaining gaps are closed at an exhaust outlet end. Otherwise, the filter element may comprise a plurality of cylindrical filter members analogous in section and made of a nonwoven web of metal fiber. The cylindrical filter members having different diameters from one another and are arranged concentrically one inside another to provide gaps between the adjacent filter members, wherein alternate ones of the gaps are closed at an exhaust inlet end, while the other gaps are closed at an exhaust outlet end.

We have also invented particulate traps for use with a diesel engine comprising the following filter elements (1) or (2).

(1) A filter element comprising a plurality of tapered tubular filter members made of a nonwoven web of heat-resistant metal fiber and each having a small-diameter end and a large-diameter end. The filter members are concentrically and alternately inversely nested one inside another. The innermost filter member has its small-diameter end closed, while the gaps between the adjacent filter members are closed alternately at an exhaust inlet end and an exhaust outlet end by connecting the small-diameter end of each filter member to the large-diameter end of the immediately inner filter member.

(2) A filter element comprising a sheet of filter material which is bent alternately inversely to close the gaps between the flat plate-shaped filter portions alternately at the exhaust inlet end and exhaust outlet end.

The cylindrical filter members forming the filter element (1) may have either a circular section or a polygonal section.

Preferably, the filter members forming the filter element are formed from a nonwoven fabric of heat-resistant metal fiber with continuous pores. The dimension of each gap formed between plate-like filter members or cylindrical ones is preferably not more than 10 mm to provide a sufficiently compact particulate trap.

Preferably, the filter element comprising a plurality of parallel plate members is formed by alternately inversely bending a sheet of filter material so as to provide flat plate-shaped filter members and wall portions integral with the adjacent flat plate-shaped filter members and alternately closing the inlet and outlet ends of the respective gaps, and inserting liners between the adjacent flat plate-shaped filter members on both sides thereof to seal both sides thereof.

Also, in order to reduce the pressure drop, the filter element may comprise at least two filter materials having different pore diameters from one another, the filter material having a larger pore diameter being provided nearer to the exhaust inlet side.

Alumina whiskers may be provided on the surface of the filter material forming the filter element to catch suspended particulate matter (SPN).

A catalyst may be carried on any of the filter elements to give the particulate trap the function of a catalytic converter in addition to its particulate trapping function. Such a catalyst may be carried on one or both sides of the filter material made of a nonwoven fabric of heat-resistant metal fiber, or on a three-dimensionally reticulated porous member of a heat-resistant metal having continuous pores and provided on one or either side of the nonwoven fabric.

Since the particulate trap according to the present invention comprises a filter element made up of a plurality of parallel flat plate-shaped filter members, or a plurality of concentrically arranged filter members, it is possible to increase the number of such filter members and thus the surface area of the filter element simply by reducing the gaps between adjacent filter members without a need for increasing the size of the entire trap. Thus, even if the pore size of the filter is reduced in an attempt to increase the particulate trapping capacity, it is possible to prevent the filter from clogging with particulates simply by increasing its surface area. Since the filter is less likely to clog with particulates, the differential pressure is less likely to increase for a long time.

Further, since the filter element of the diesel particulate trap according to the present invention is made of a non-woven fabric of metal fiber, its heat conductivity is high, so that its internal temperature is kept uniform during regeneration, namely heat spots are difficult to develop. The filter is thus less likely to be melted or cracked due to thermal stress.

The filter element made up of tubular filter elements having a circular section is especially durable because it can dissipate heat more uniformly during regeneration.

The filter element comprising a plurality of concentrically and alternately inversely arranged tapered cylindrical metal filter members, or the filter element comprising a web of filter material which is bent alternately inversely, has an advantage in that the filter surface area can be increased without increasing the size of the trap in the direction perpendicular to the flow direction of exhausts (diametric direction of the particulate trap). Also, the area of the opening of each gap formed between the adjacent filter members through which exhausts flow can be easily increased to such an extent that it may not be clogged with particulates. Thus, it is possible to markedly reduce the initial pressure drop. Such a filter will never be clogged with a small amount of particulates trapped, nor will it suffer any sharp increase in the pressure drop.

The filter element having pores of diameters decreasing toward the exhaust outlet side is especially preferable because it can catch particulates uniformly in the direction of thickness of the filter. This slows down the rising speed of the pressure drop even more. Namely, the differential pressure is kept small for a long period of time.

The width of each gap between filter members is preferably 10 mm or less, because by arranging the filter members with small gaps left therebetween, it is possible to increase the filter surface area with a limited mounting space.

For higher mass-productivity and low cost, the filter element comprising parallel flat plate-shaped filter members may be formed by alternately inversely bending a sheet of filter material, and then sealing both sides of the gaps between the adjacent filter plates. For the same purpose, such a filter element may be formed by arranging a plurality of separate flat plate-shaped filter members parallel to each other, sealing alternate ends of the gaps by inserting liners between the filter members, and finally sealing both sides of the gaps with liners.

The filter element comprising a plurality of concentrically arranged cylindrical filter members having different diameters from one another can be manufactured easily at low cost in the following manner.

One known way to form a filter that is small in volume, yet large in its surface area is to weld both sides of the filter members to side plates with high accuracy. But it is not only extremely troublesome and difficult but may be impossible to weld all the filter members arranged at small pitches to side plates. Even if this is possible, there is no doubt that such a filter element can be manufactured only at an extremely high cost. In contrast, the filter element for the trap according to the present invention can be manufactured at low cost because no accurate welding is needed.

By growing alumina whiskers on the surface of the filter members formed from an unwoven fabric of heat-resistant metal fiber, it is possible to reduce the size of the filter pores defined by the metal fiber. Such a filter can catch suspended particulate matter (SPN), whose diameter is usually 2 $\mu$m or less.

A catalyst may be carried on one or both sides of the filter material made of a nonwoven fabric of heat-resistant metal fiber, or on a three-dimensionally reticulated porous member of a heat-resistant metal having continuous pores and provided on one or either side of the nonwoven fabric. By providing a catalyst on the porous member having pores, the particulate trap of the invention is given the function of a catalytic converter in addition to its particulate trapping function. Further, since the member carrying the catalyst is a highly porous metal and thus low in heat capacity, the catalyst can be heated quickly by exhaust to a temperature at which it is activated.

By setting the catalyst on the alumina whiskers, it is possible to increase the catalyst-carrying area.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1A:
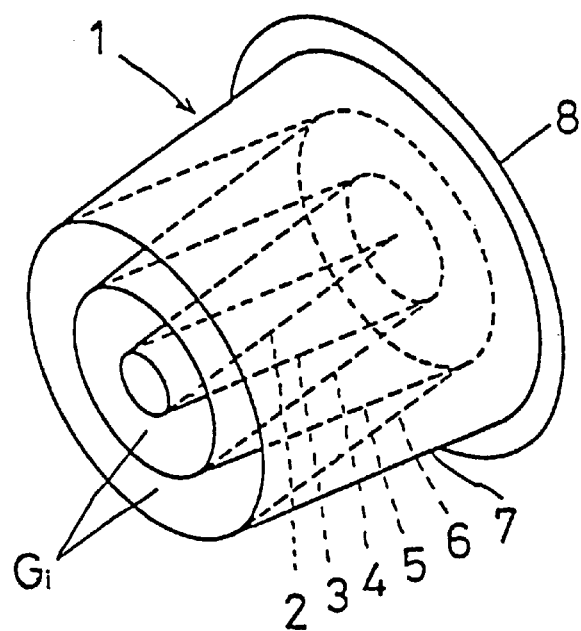
FIG. 1A is a perspective view of a first embodiment of a filter element according to the present invention.
Figure 1B:
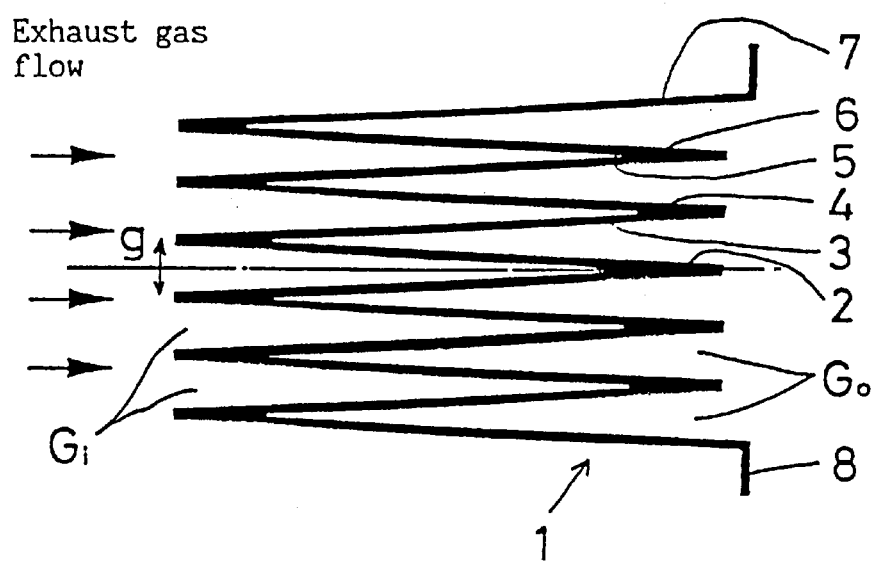
FIG. 1B is a sectional view of the same.

FIGS. 1A and 1B show a filter element for use as a particulate trap embodying the present invention. This filter element 1 comprises a plurality of filter members 2–7 made of a heat-resistant metal. They have each the shape of a truncated cone having large- and small-diameter ends (except the member 2, which is conical and thus has a closed end), and are concentrically and alternately inversely arranged one inside another so that each filter member is joined at its small-diameter end to the large-diameter end of the inner, adjacent filter member. The central filter member 2 may be a truncated conical member like the other filter members. In this case, its small-diameter end has to be closed with a disk-shaped filter member.

By arranging the filter members this way, gaps Gi at one end of the filter element 1 (exhaust inlet end) are closed at the other end (exhaust outlet end), and gaps Go open at the exhaust outlet end are closed at the exhaust inlet end.

The outermost filter member 7 may be provided with a mounting flange 8 at its large-diameter end.

For high mounting space efficiency and uniform heat dissipation during regeneration, it is most desirable to form the filter member from (truncated) conical filter members. But it may be formed from (truncated) pyramidal filter members. In either case, the size g (see FIG. 1B) of the gaps between the adjacent filter members should be limited to not more than 10 mm.

Figure 2A:
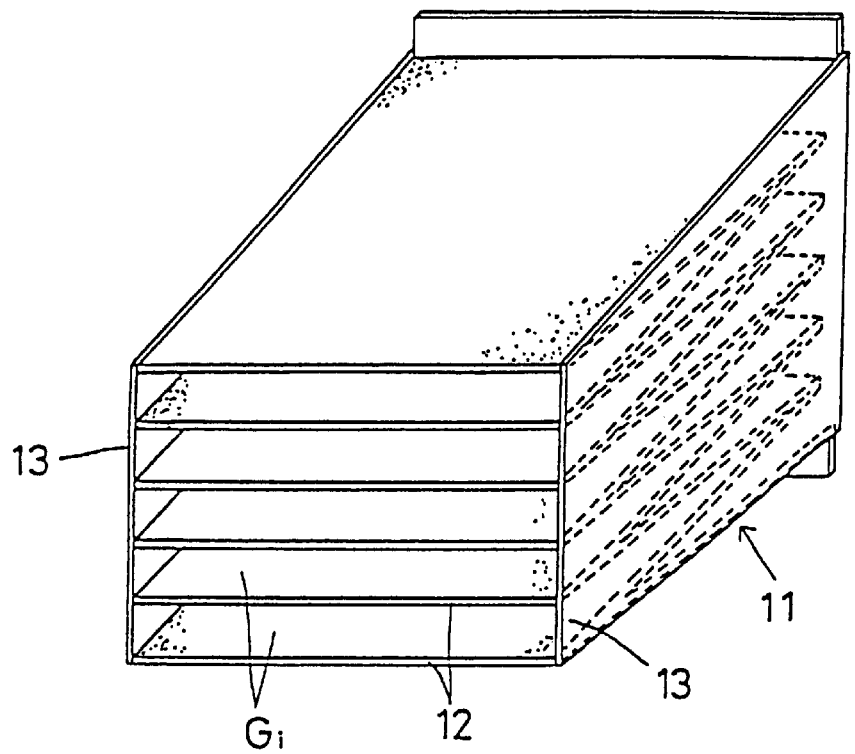
FIG. 2A is a perspective view of a second embodiment.
Figure 2B:
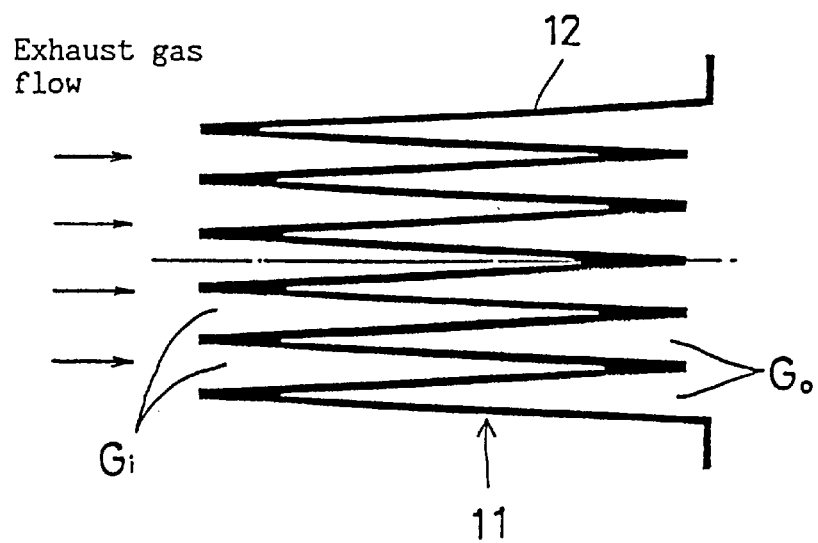
FIG. 2B is a sectional view of the same.

FIGS. 2A and 2B show a filter element of a different type. This filter element 11 comprises a flat plate-shaped filter member made of a heat-resistant metal and bent so as to form, as a whole, a zigzag pattern with closed ends formed alternately. Thus, gaps are formed alternately at inlet ends and outlet ends between the adjacent flat plate-shaped filter members 12. The adjacent flat plate-shaped filter members 12 are connected together by welding heat-resistant metal plates 13 to both sides of the filter members 12.

FIGS. 3A–3D shows how the filter element for use as the particulate trap of the third embodiment is assembled.

Figure 3A:
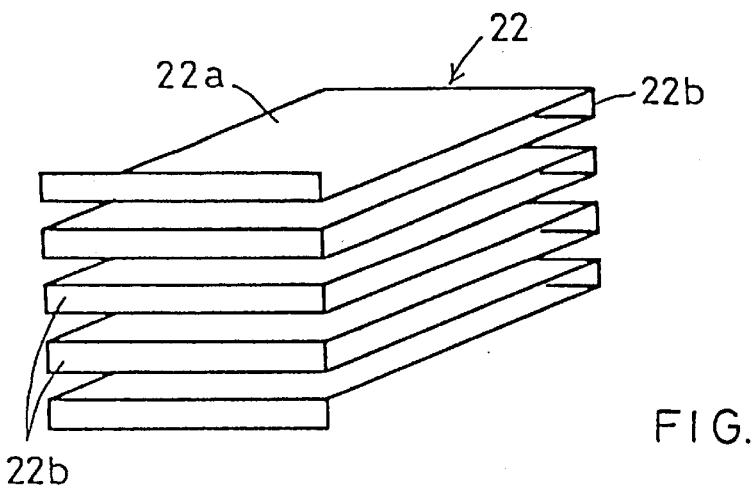
FIGS. 3A–3D show manufacturing steps of a filter element of a third embodiment.
Figure 3B:
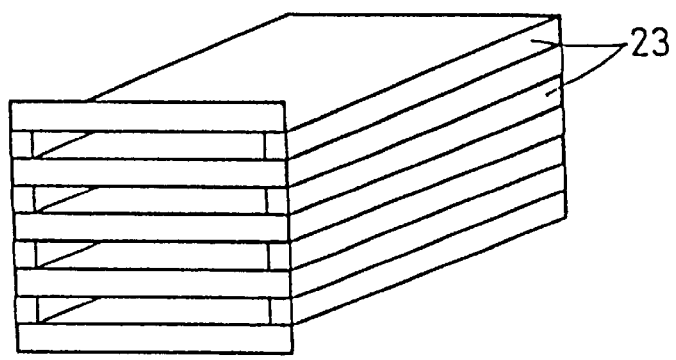
Figure 3C:
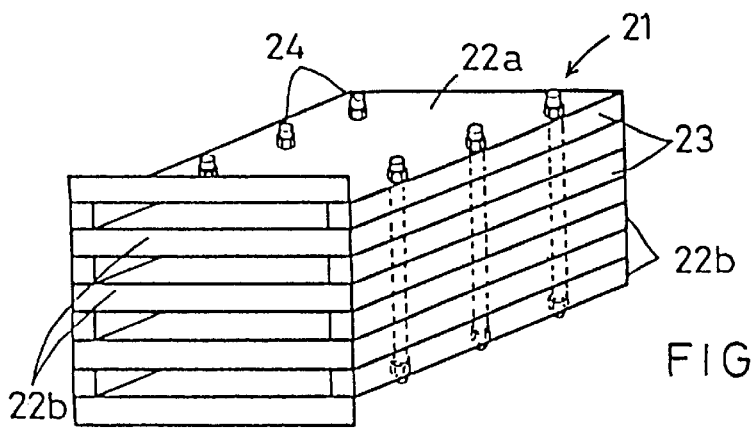
Figure 3D:
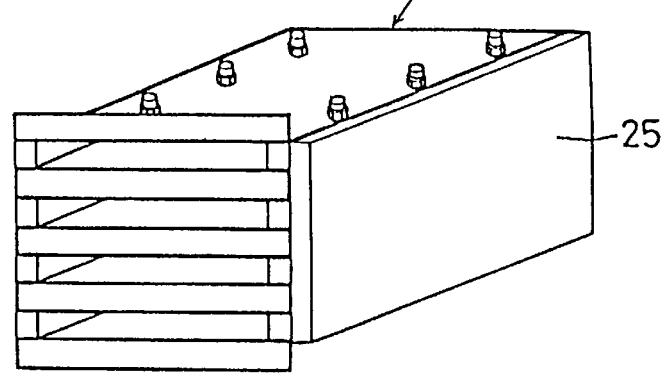

As shown in FIG. 3A, a filter 22 in the shape of a long strip of sheet is bent alternately in opposite ways to provide parallel wall portions 22a and vertical wall portions 22b so that gaps formed between the adjacent wall portions 22a are alternately closed at their inlet ends and outlet ends. Then, as shown in FIG. 3B, liners 23 are inserted into the gaps between the adjacent wall portions 22a from both sides to close both sides of the gaps. In this state, as shown in FIG. 3C, the wall portions 22a and the liners 23 are fastened together by tightening bolts 24. But they may be fastened together by welding. Further, as shown in FIG. 3D, a reinforcing side plate 25 may be fastened to the filter element.

Figure 4A:
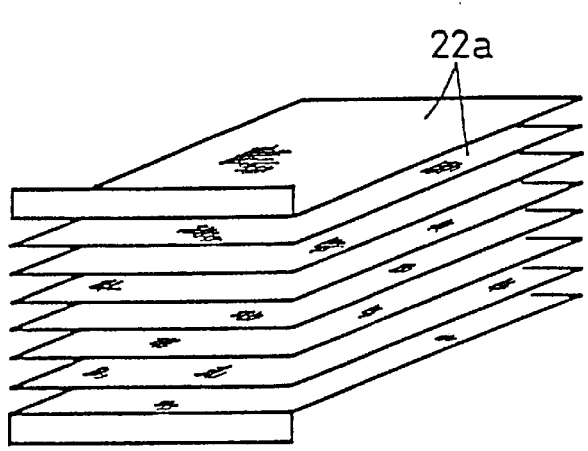
FIGS. 4A–4C show another way of manufacturing the filter element of the third embodiment.
Figure 4B:
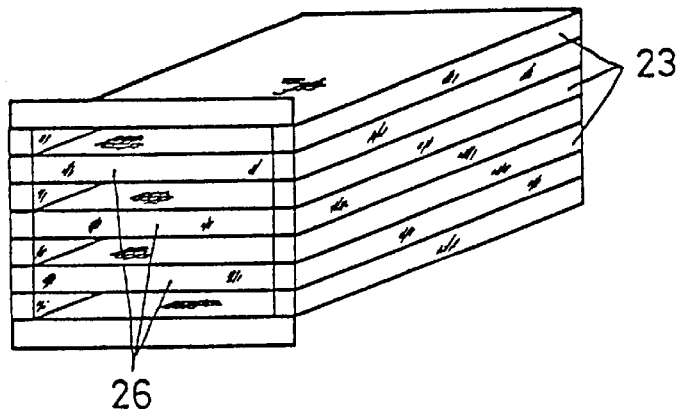
Figure 4C:
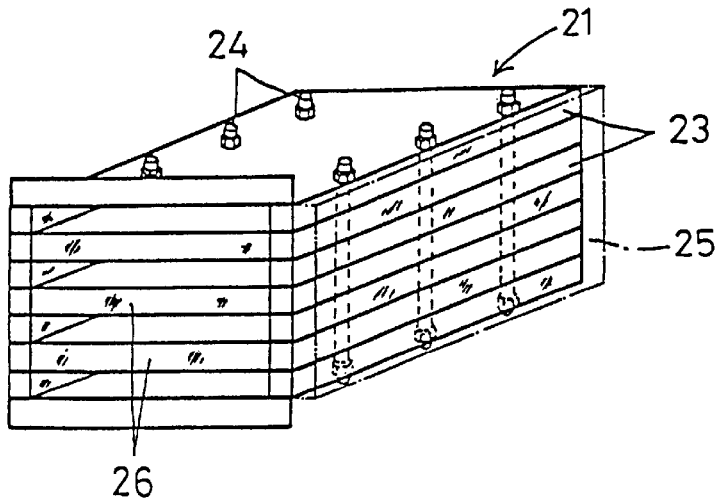

The filter element 21 of the third embodiment may be manufactured as shown in FIGS. 4A–C, by arranging a plurality of separate flat plate-shaped filter members 22a parallel to each other as shown in FIG. 4A, and inserting liners 26 alternately at one end and at the other end of the gaps between the adjacent filter members 22a and fixing them by welding as shown in FIG. 4B. Before or after inserting the liners 26, liners 23 are inserted into both sides of the gaps and welded or bolted to the filter members 22a. The same reinforcing side plate 25 shown in FIG. 3 may be fastened thereafter.

Figure 5A:
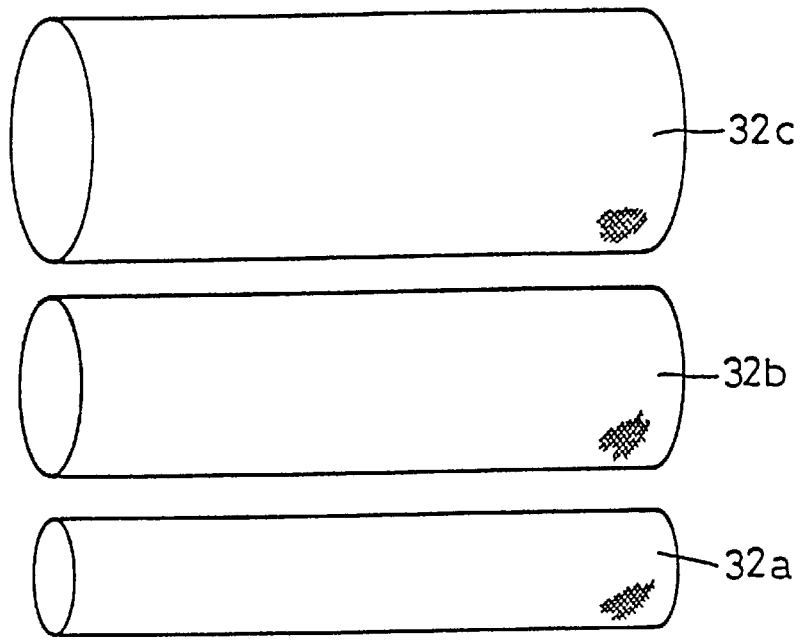
FIGS. 5A–5C show manufacturing steps of a filter element of a fourth embodiment.
Figure 5B:
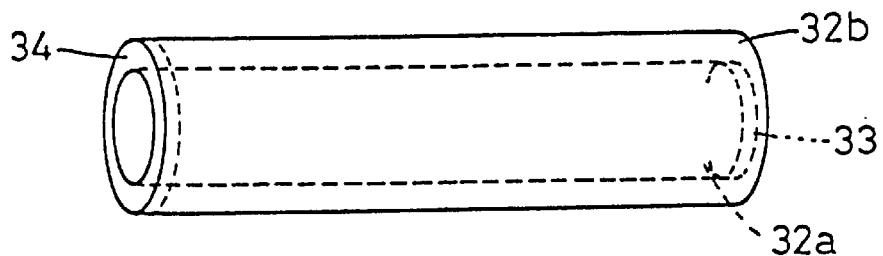
Figure 5C:
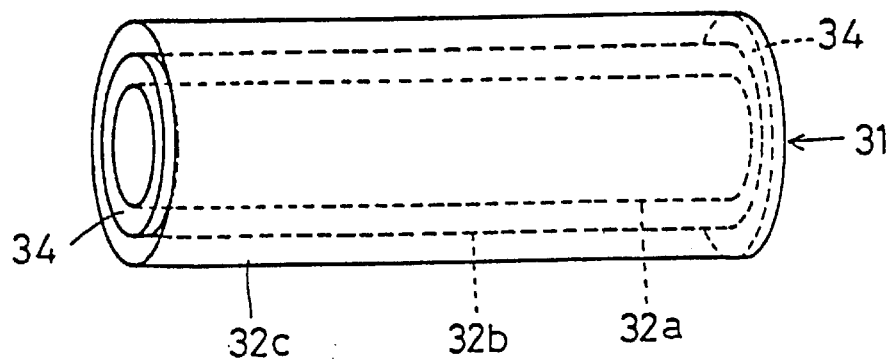

FIG. 5 shows manufacturing steps of a filter element of a fourth embodiment. This filter element 31 is formed from a plurality of cylindrical filter members 32a–32n (n is the number of filter members used) having different diameters from one another as shown in FIG. 5A. While cylindrical filter members are shown in the figure, prism-shaped ones members may be used, provided they are analogous in cross-section. The smallest-diameter cylindrical filter member 32a is inserted in the second smallest one 32b as shown in FIG. 5B, and an end plate 33 is welded to one open end of the member 32a, while an annular liner 34 is inserted between the members 32a and 32b from the other end and welded. The thus joined members are inserted in the third smallest-diameter cylindrical member 32c, and the gap between the members 32b and 32c is closed with an annular liner 34 at the one end. In the same manner, cylindrical filter members having increasingly large diameters are coupled one around the other to form the filter element 31.

But the filter element 31 may be assembled in the reverse order, namely, from the largest-diameter filter member toward the smallest-diameter one. Instead of inserting liners, flanges may be formed by alternately bending opposite ends of the adjacent cylindrical members to couple them together and at the same time close the gaps at the respective ends.

The filter members 2–7, 12, 22 and 32a–32n may be the abovementioned material, i.e. nonwoven fabric of metallic fibers, or at least two layers of such material arranged so that layers having larger holes are located nearer to the exhaust inlet.

Figure 6:
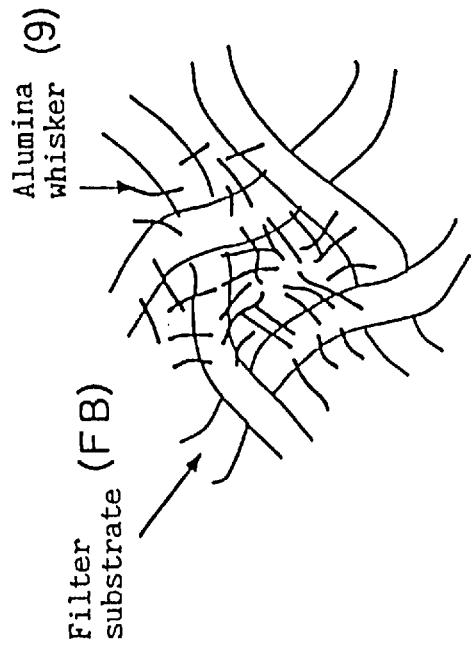
FIG. 6 is a schematic view showing how alumina whiskers are grown on the filter substrate.

As shown in FIG. 6, such nonwoven fabric of metallic fiber may comprise a fiber backing FB and numerous alumina whiskers 9 thinner than the fiber forming the backing FB. By adding such whisker, it is possible to increase the number of holes and at the same time reduce the size of each hole.

Figure 7:
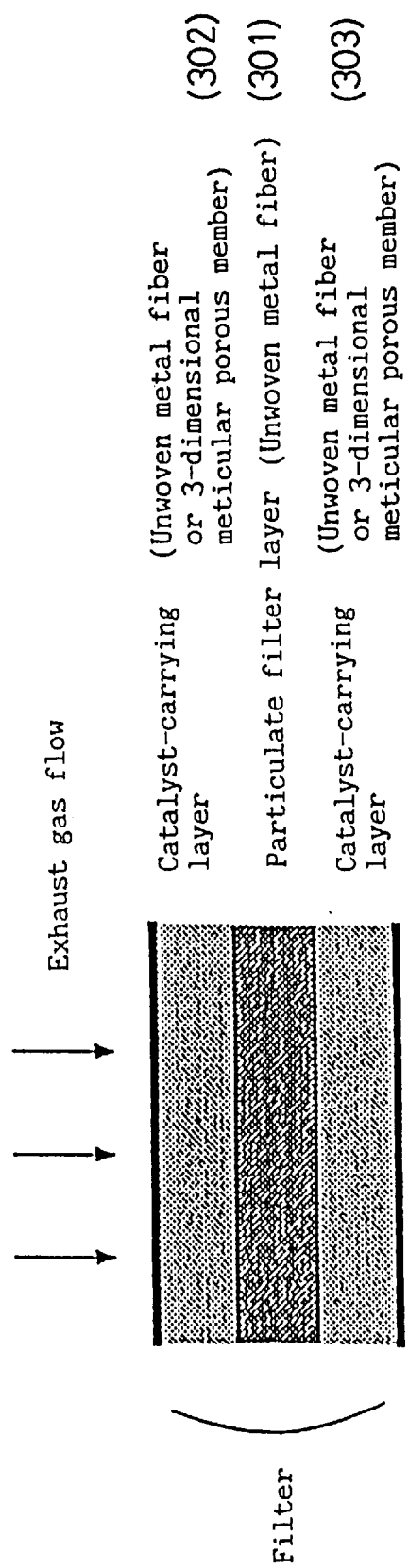
FIG. 7 is a partial enlarged sectional view of a filter.

FIG. 7 is an enlarged view of the filter members 2–7, 12, 22 and 32a–32n. These filter members may comprise a particulate trapping layer 301 made of the abovementioned material, and a plurality of catalyst carrying layers 302 and 303 shown in FIG. 7.

Figure 8:
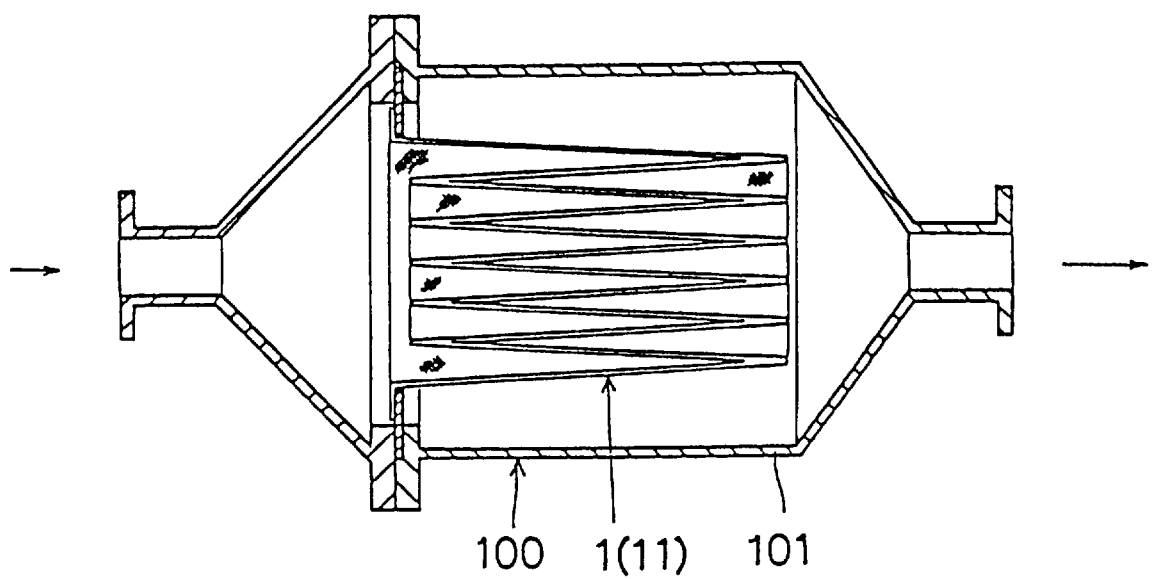
FIG. 8 is a sectional view of one example of a particulate trap according to the present invention.

FIG. 8 shows a particulate trap according to the present invention which includes the filter element 1 shown in FIG. 1 or the filter element 11 shown in FIG. 2. Namely, this particulate trap 100 comprises a metal case 101 and the filter element 1 or 11 mounted in the case 101. The arrows in the figure indicates direction in which exhausts flow. But the case 101 may be mounted inversely so that exhaust flows through the trap 100 in the direction opposite to the one indicated by arrows in the figure.

Figure 9:
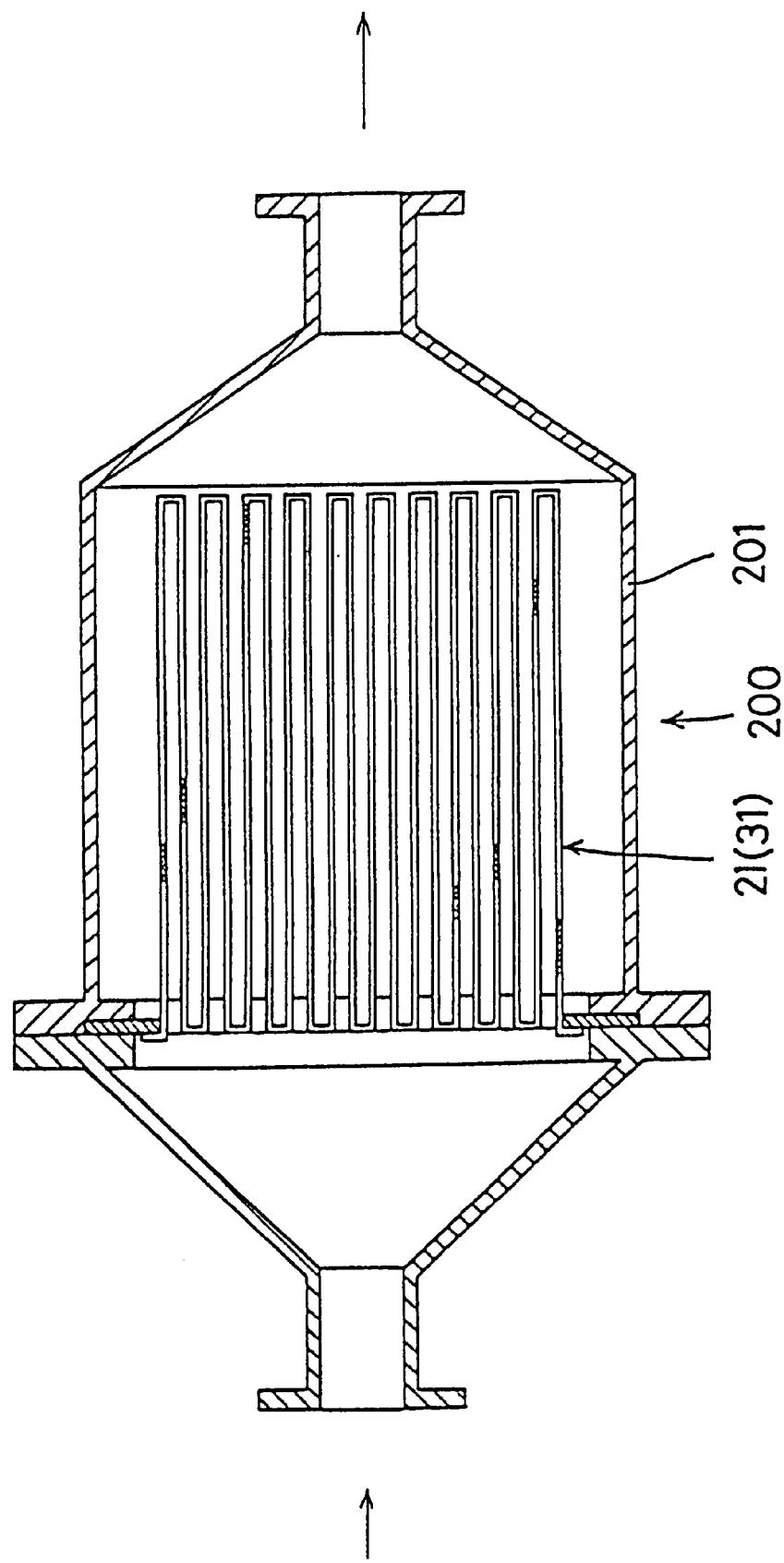
FIG. 9 is a sectional view of another example of a particulate trap according to the present invention.

FIG. 9 shows (in section) another particulate trap according to the present invention. This trap 200 comprises a case 201 mounted in an exhaust line of a car, and the filter element 21 shown in FIG. 3 or the filter element 31 shown in FIG. 4, which is mounted in the case 201. Arrows indicate the flow direction of exhausts. But the case 201 may be mounted inversely so that exhaust flows through the trap in the opposite direction.

Figure 10:
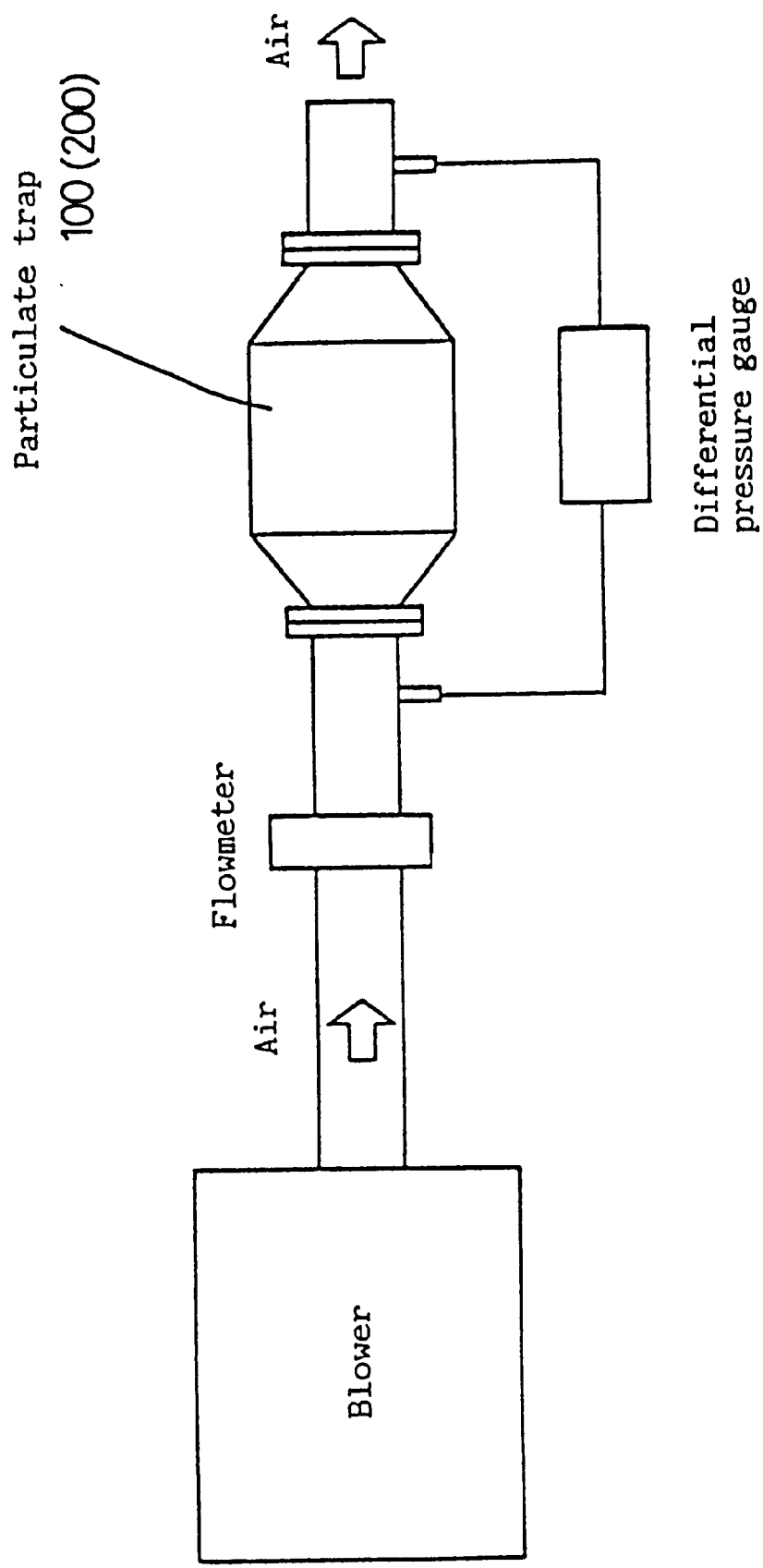
FIG. 10 is a schematic view of a test device for measuring an initial pressure drop.

FIG. 10 shows a device used to measure the initial pressure drop. This device is used to see the relationship between the flow rate of air which flows through the particulate trap and the pressure drop.

Figure 11:
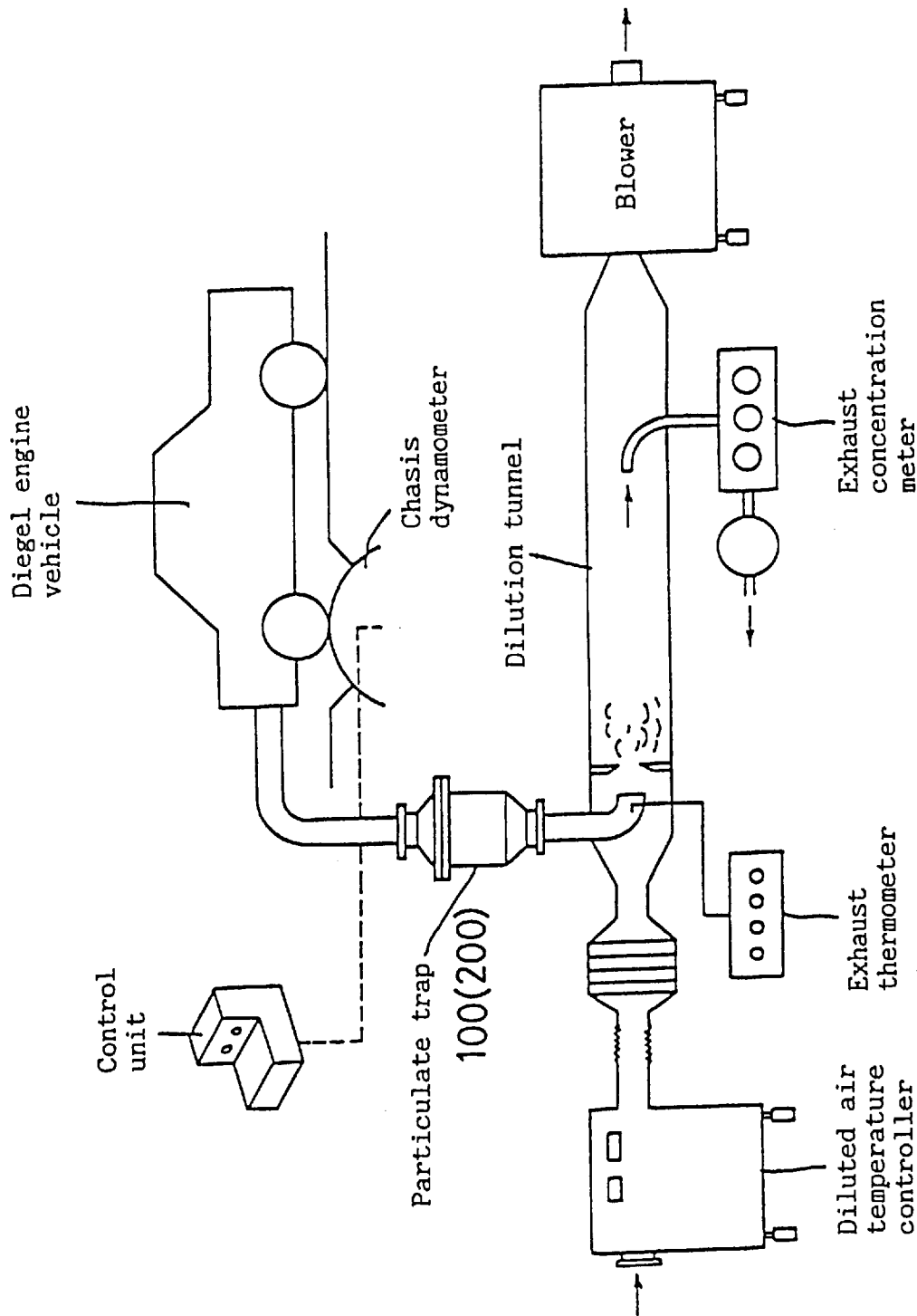
FIG. 11 is a schematic view of a test device for measuring the pressure drop and durability.

FIG. 11 shows a test device used to measure the particulate trapping efficiency, pressure drop when trapping particulates, durability, NO removing rate, and SOF removing rate. The test device includes a diesel engine vehicle (3400 cc, 4-cylinder), a chassis dynamometer and a dilution tunnel.

EXAMPLE 1

The particulate trap 100, i.e. the trap including the filter element 1 or 11 (shown in FIGS. 1 and 2), was mounted in the test devices shown in FIGS. 10 and 11. The filter elements 1 and 11 correspond to specimens A and B in Table 1, respectively. Each of the specimens A and B has an exhaust-incoming surface area of 1.2 m², and is mounted in a case having an internal volume of 2.5 liters. As shown in FIGS. 1B and 2B, exhausts introduced into the trap flow into the gaps Gi, which are provided alternately with the gaps Go, pass through the filter members into the gaps Go, and are discharged from the trap.

Specimens A and B may be formed from a metallic material listed in the table, i.e. Fe—Cr—Al alloy and Ni—Cr—Al alloy. But this is a mere example.

For comparison purposes, we prepared a specimen Q, a honeycomb type particulate trap for use in a diesel engine (made of cordierite by Nihon Gaishi Co., DHC-221), which is known to be sufficiently high in its particulate trapping capacity. This trap has a case 2.5 liter in internal volume, i.e. the same as those accommodating specimens A and B.

TABLE 1

| | Filter element | | | | | |
|---|---|---|---|---|---|---|
| | Material | Material | Thickness | Packing density | Filter area | Structure |
| Specimen A (Invented) | Unwoven metal (fiber 20 μm dia) | Ni—Cr—Al | 0.5 mm | 20% | 1.2 m² | FIG. 1 |
| Specimen B (Invented) | Unwoven metal (2-Layer, 25 μm, 15 μm dia) | Fe—Cr—Al | 0.5 mm | 20% | 1.2 m² | FIG. 2 |
| Specimen Q (Comparative) | Cordierite | MgO—Al₂O₃—SiO₂ | 0.5 mm | 50% | 2.3 m² | |

First, particulate trapping efficiency and pressure drop were measured.

Figure 12:
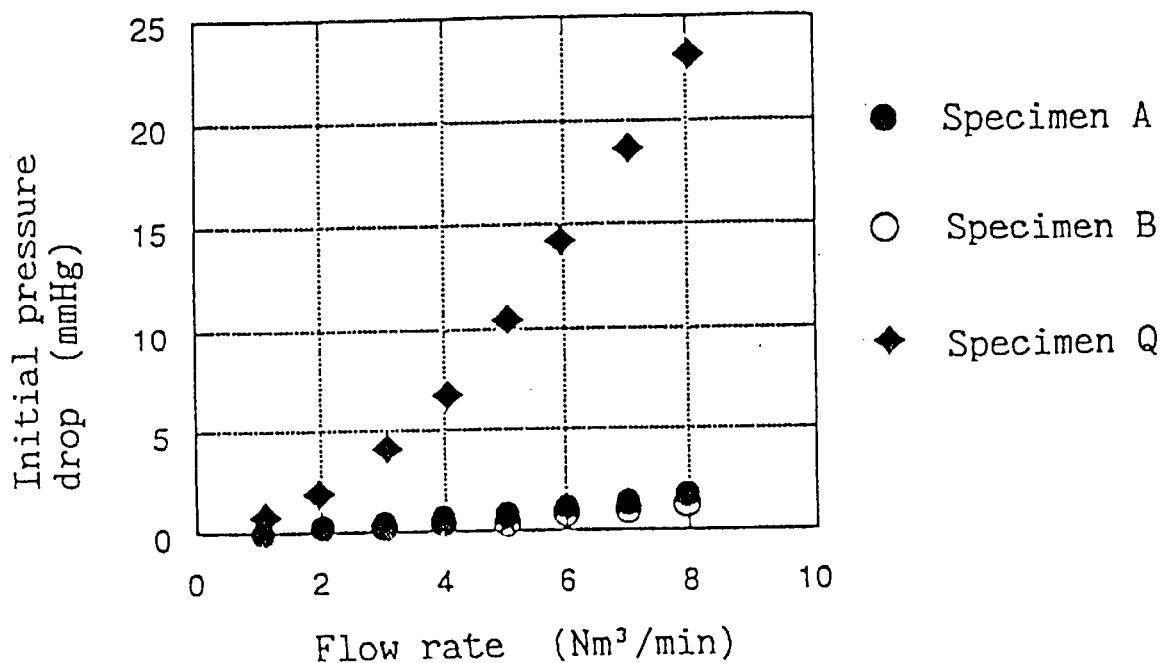
FIG. 12 is a graph showing the initial pressure drop for specimens A, B and Q.
Figure 13:
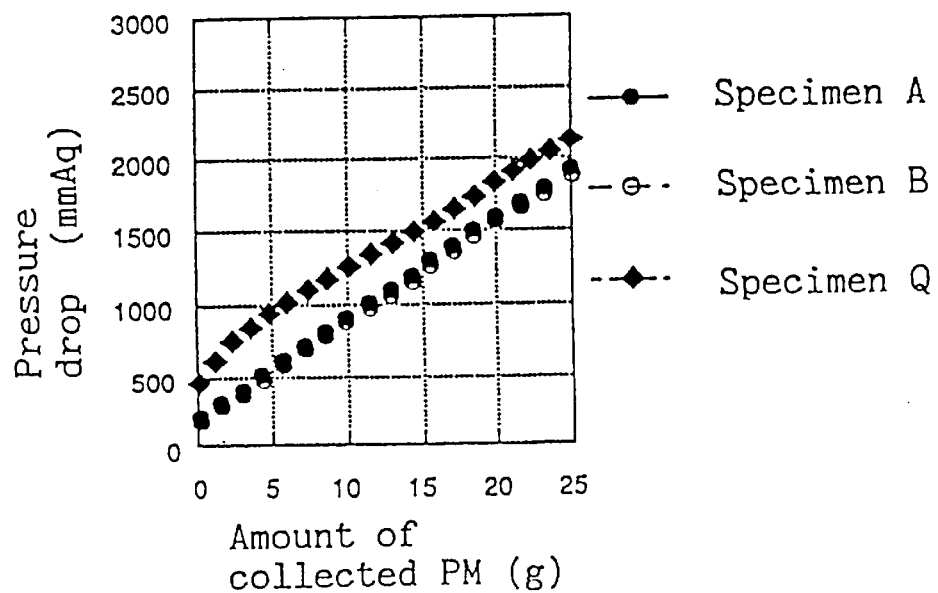
FIG. 13 is a graph showing the relationship between the pressure drop and the amount of particulates trapped for specimens A, B and Q.
Figure 14:
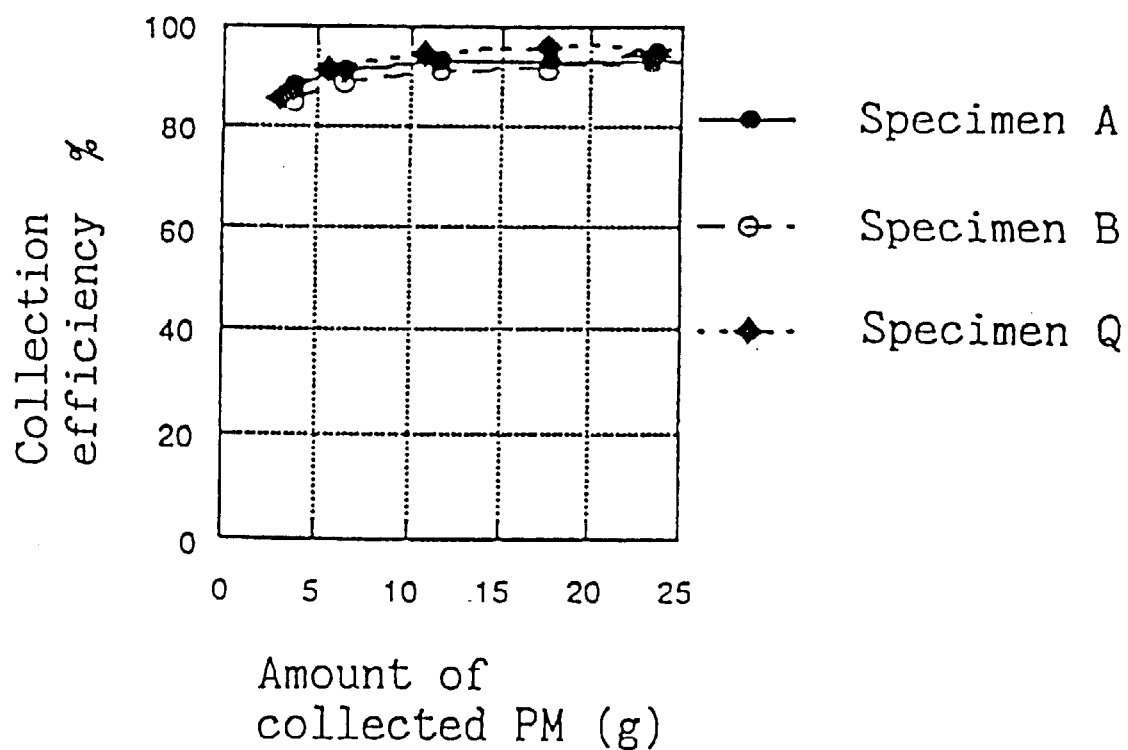
FIG. 14 is a graph showing the relationship between the particulate trapping efficiency and the amount of particulates trapped for specimens A, B and Q.

The results are shown in FIGS. 12–14. The particulate trapping capacity is determined in terms of the relationships between the pressure drop and the amount of particulates trapped and between the particulate trapping efficiency and the amount of particulates trapped. As shown in FIG. 12, the specimens A and B were far lower in initial pressure drop than the specimen Q. As for particulate trapping capacity, specimens A and B were substantially equivalent to specimen Q and thus satisfactory.

Next, we measured the durability of each filter element when regenerating it.

When 15 g of particulates discharged from a diesel engine were collected in each of the specimens A, B and Q, the filter element was regenerated by supplying gas heated to 600° C. by an electric heater provided in front of the diesel particulate trap into the trap, while keeping the diesel engine idling. After repeating this regeneration test five times, the specimens were observed to check if they suffered any damage. The results of observation are shown in Table 2.

TABLE 2

| | Regeneration test result |
|---|---|
| Specimen A (Invented) | Not broken |
| Specimen B (Invented) | Not broken |
| Specimen Q (Comparative) | Crack formed |

As shown in Table 2, specimens A and B suffered no damage at all, while specimen Q developed cracks.

From these results, it is apparent that specimens A and B according to the present invention are substantially equivalent in their particulate trapping capacity and pressure drop to a cordierite honeycomb trap, while they sufficiently low in initial pressure drop. Also, they showed reliable durability when burning particulates for regeneration. In short, specimens A and B are excellent diesel particulates traps.

EXAMPLE 2

The particulate trap 100 comprising the filter element 1 or 11 shown in FIGS. 1 and 2 was mounted in the test devices shown in FIGS. 10 and 11. The filter elements 1 and 11 correspond to specimens C, D and E in Table 3, respectively. Each of the specimens C, D and E has an exhaust-incoming surface area of 1.2 m², and is mounted in a case having an internal volume of 2.5 liters. Each specimen is comprised of an NOx catalyst-carrying layer (302 in FIG. 7), a particulate-trapping layer (301 in FIG. 7), and another NOx catalyst-carrying layer (303 in FIG. 7). As shown in FIGS. 1B and 2B, exhaust introduced into the trap flows into the gaps Gi, which are provided alternately with the gaps Go, passes through all filter members into the gaps Go, and is discharged from the trap. A substrate of each NOx catalyst-carrying layers was formed of an Ni—Cr—Al-alloyed, Ni-based three-dimensionally reticulated porous material made by Sumitomo Electric Industries, Ltd. (Trade name: Cermet #7). γ-alumina was applied to the surface of the substrate at a rate of 100 g/liter of metallic nonwoven fabric to form a catalyst-carrying coating layer. Cu as a catalyst was uniformly carried on the coating layer at a rate of 1.0 g/liter.

The metallic nonwoven fabric forming specimens C, D and E are formed from Fe—Cr—Al alloy and Ni—Cr—Al alloy. But this is a mere example.

For comparison purposes, we used the specimen Q used in Example 1. This trap has a case 2.5 liter in internal volume, i.e. the same case as those accommodating specimens C, D and E.

As in Example 1, particulate trapping efficiency and pressure drop were measured first.

Figure 15:
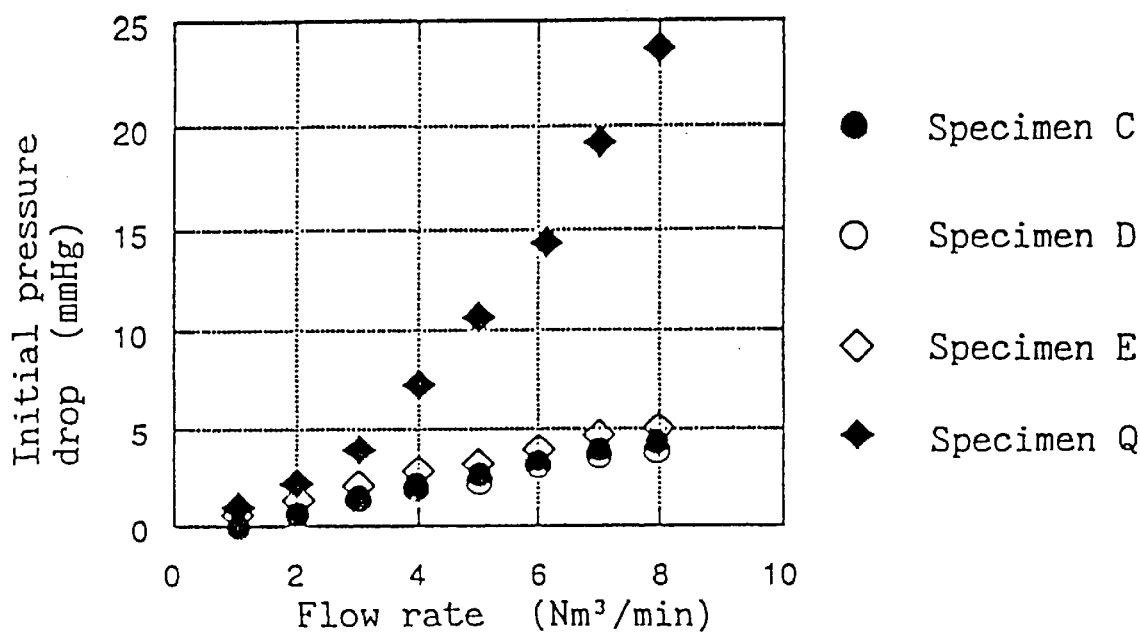
FIG. 15 is a graph showing the initial pressure drop for specimens C, D, E and Q.
Figure 16:
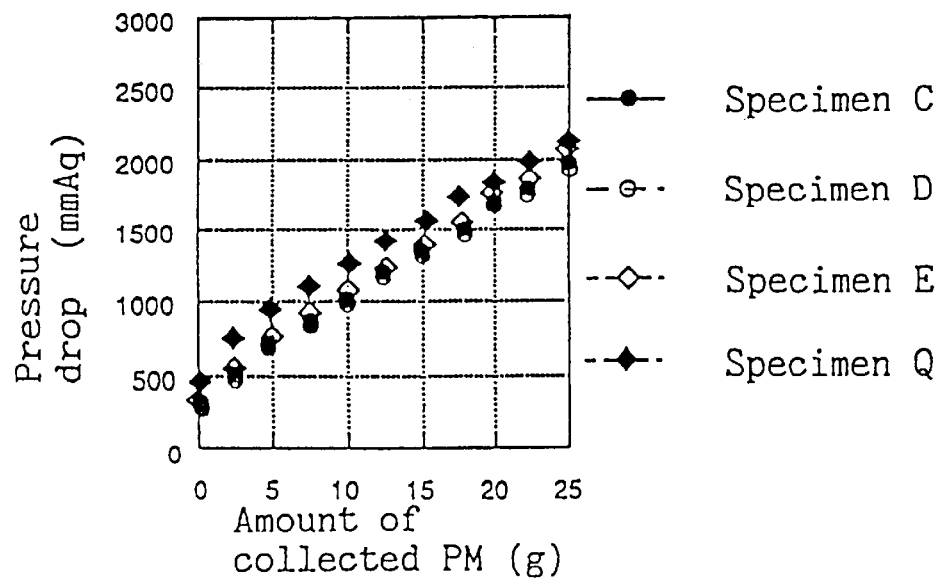
FIG. 16 is a graph showing the relationship between the pressure drop and the amount of particulates trapped for specimens C, D, E and Q.
Figure 17:
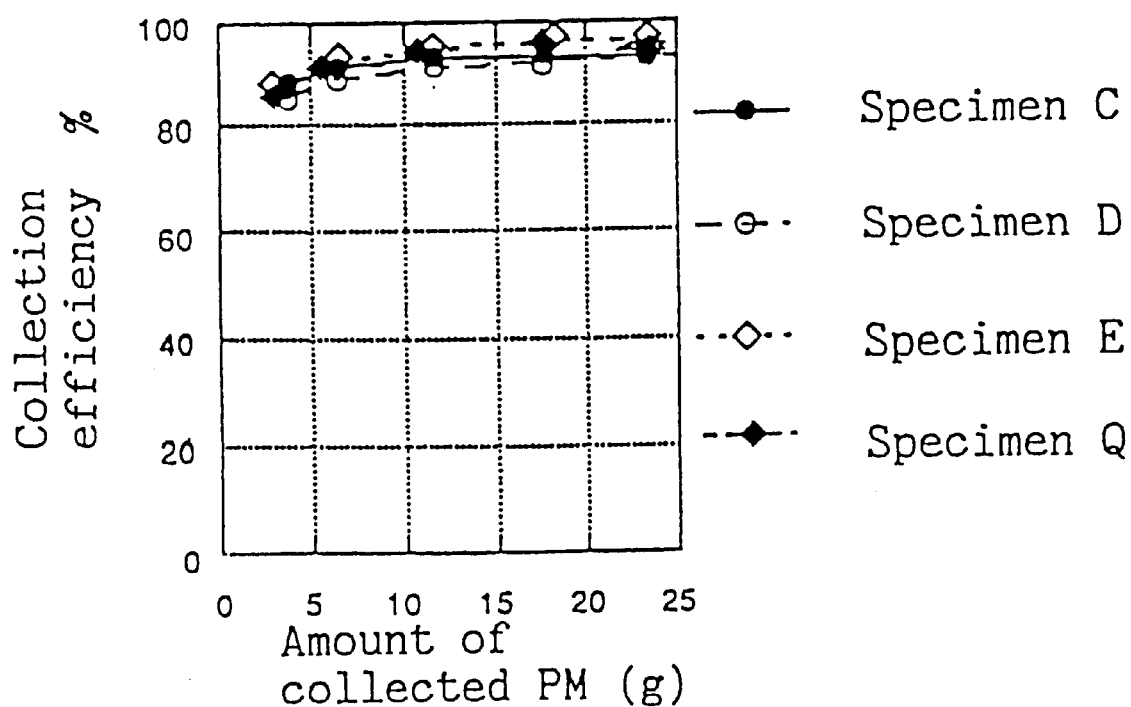
FIG. 17 is a graph showing the relationship between the particulate trapping efficiency and the amount of particulates trapped for specimens C, D, E and Q.

The results are shown in FIGS. 15–17. The particulate trapping capacity is determined in terms of the relationships between the pressure drop and the amount of particulates trapped and between the particulate trapping efficiency and the amount of particulates trapped. As shown in FIG. 15, the specimens C, D and E were far lower in initial pressure drop than specimen Q, that is, a honeycomb type diesel particulate trap. As for particulate trapping capacity, specimens C, D and E were substantially equivalent to specimen Q and thus satisfactory.

Next, we measured the durability of each filter element when regenerating it under the same conditions as in Example 1. After repeating this regeneration test five times, the specimens were observed to check if they

TABLE 5

| Item | Condition |
|---|---|
| NO concentration in exhaust | 1000 ppm |
| $C_2H_4$ concentration in exhaust | 250 ppm |
| $O_2$ concentration in exhaust | 2% |
| Exhaust temperature | 250° C. |

After maintaining the exhaust at 250° C. for two minutes, the NO concentration was measured. FIG. 6 shows the average NO concentration.

TABLE 3

| | Filter element | | | | | |
|---|---|---|---|---|---|---|
| | Material | Material | Thickness | Packing density of collecting area | Filter area | Structure |
| Specimen C (Invented) | (1) Unwoven metal (fiber 100 μm dia) + γ-$Al_2O_3$ + Cu<br>(2) Unwoven metal (fiber 20 μm dia)<br>(3) Unwoven metal (fiber 100 μm dia) + γ-$Al_2O_3$ + Cu<br>3-layer | (1) Ni—Cr—Al + γ-$Al_2O_3$ + Cu<br>(2) Ni—Cr—Al<br>(3) Ni—Cr—Al + γ-$Al_2O_3$ + Cu | 1.5 mm | 20% | 1.2 $m^2$ | FIG. 1 |
| Specimen D (Invented) | (1) Unwoven metal (fiber 100 μm dia) + γ-$Al_2O_3$ + Cu<br>(2) Unwoven metal (fiber 20 μm dia)<br>(3) Unwoven metal (fiber 100 μm dia) + γ-$Al_2O_3$ + Cu<br>3-layer | (1) Fe—Cr—Al + γ-$Al_2O_3$ + Cu<br>(2) Fe—Cr—Al<br>(3) Fe—Cr—Al + γ-$Al_2O_3$ + Cu | 1.5 mm | 20% | 1.2 $m^2$ | FIG. 2 |
| Specimen E (Invented) | (1) Cermet #7* + γ-$Al_2O_3$ + Cu<br>(2) Unwoven metal (fiber 20 μm dia)<br>(3) Cermet #7 + γ-$Al_2O_3$ + Cu<br>3-layer | (1) Ni—Cr—Al + γ-$Al_2O_3$ + Cu<br>(2) Ni—Cr—Al<br>(3) Ni—Cr—Al + γ-$Al_2O_3$ + Cu | 1.5 mm | 20% | 1.2 $m^2$ | FIG. 1 |
| Specimen Q (Comparative) | Cordierite | MgO—$Al_2O_3$—$SiO_2$ | 0.5 mm | 50% | 2.3 $m^2$ | |

*Cermet is the product of Sumitomo Electric Industries Co. which is a 3-dimensional reticular structure.
7 is model number. It indicates that the number of cells is 50–70 per inch suffered any damage. The results of observation are shown in Table 4.

TABLE 4

| | Regeneration test result |
|---|---|
| Specimen C (Invented) | Not broken |
| Specimen D (Invented) | Not broken |
| Specimen E (Invented) | Not broken |
| Specimen Q (Comparative) | Crack formed |

As shown in Table 4, specimens C, D and E suffered no damage at all, while specimen Q developed cracks.

Then, we measured NO removing rates for specimens C, D and E. In this test, $C_2H_4$ as a reducing agent was introduced into the exhaust. Exhaust was introduced under the conditions shown in Table 5.

TABLE 6

| | NO concentration |
|---|---|
| Specimen C (Invented) | 500 ppm |
| Specimen D (Invented) | 500 ppm |
| Specimen E (Invented) | 500 ppm |

As shown, the NO concentration decreased by half by passing exhausts through specimens C, D or E.

From these results, it is apparent that specimens C, D and E according to the present invention are substantially equivalent to a cordierite honeycomb trap in their particulate trapping capacity and pressure drop, while they are sufficiently low in initial pressure drop. Also, they showed good durability when burning particulate for regeneration. In short, specimens according to the present invention are excellent as diesel particulates traps. Moreover, since these filter elements are capable of removing NO in exhausts, there is no need to provide a separate catalytic converter. Thus, by using the filter element according to the present invention, it is possible to reduce the mounting space and manufacturing cost of a diesel exhaust post-treatment device.

EXAMPLE 3

The particulate trap 100 comprising the filter element 1 or 11 shown in FIGS. 1 and 2 was mounted in the test devices shown in FIGS. 10 and 11. The filter elements 1 and 11 correspond to specimen F and specimens G and H in Table 3, respectively. Each of the specimens F, G and H has an exhaust-incoming surface area of 1.2 m$^2$, and is mounted in a case having an internal volume of 2.5 liters. Each specimen is comprised of a particulate-trapping layer (301 in FIG. 7), and an SOF catalyst-carrying layer (303 in FIG. 7). As shown in FIGS. 1B and 2B, exhausts introduced into the trap flow into the gaps Gi, which are provided alternately with the gaps Go, pass through all the filter members into the gaps Go, and are discharged from the trap.

A substrate of the SOF catalyst-carrying layer was formed of an Ni—Cr—Al-alloyed one of a Ni-based three-dimensionally reticulated porous material made by Sumitomo Electric Industries, Ltd (Trade name: Cermet #7). γ-alumina was applied to the surface of the substrate at a rate of 150 g/liter of metallic nonwoven fabric to form a catalyst-carrying coating layer. Pt as a catalyst was uniformly carried on the coating layer at a rate of 1.5 g/liter.

The metallic porous member forming specimens F, G and H may be formed from a material other than those listed in the table, i.e. Fe—Cr—Al alloy and Ni—Cr—Al alloy.

For comparison purposes, we used the specimen Q used in Example 1. This trap has a case 2.5 liter in internal volume, i.e. the same case as those accommodating specimens A and B.

Figure 18:
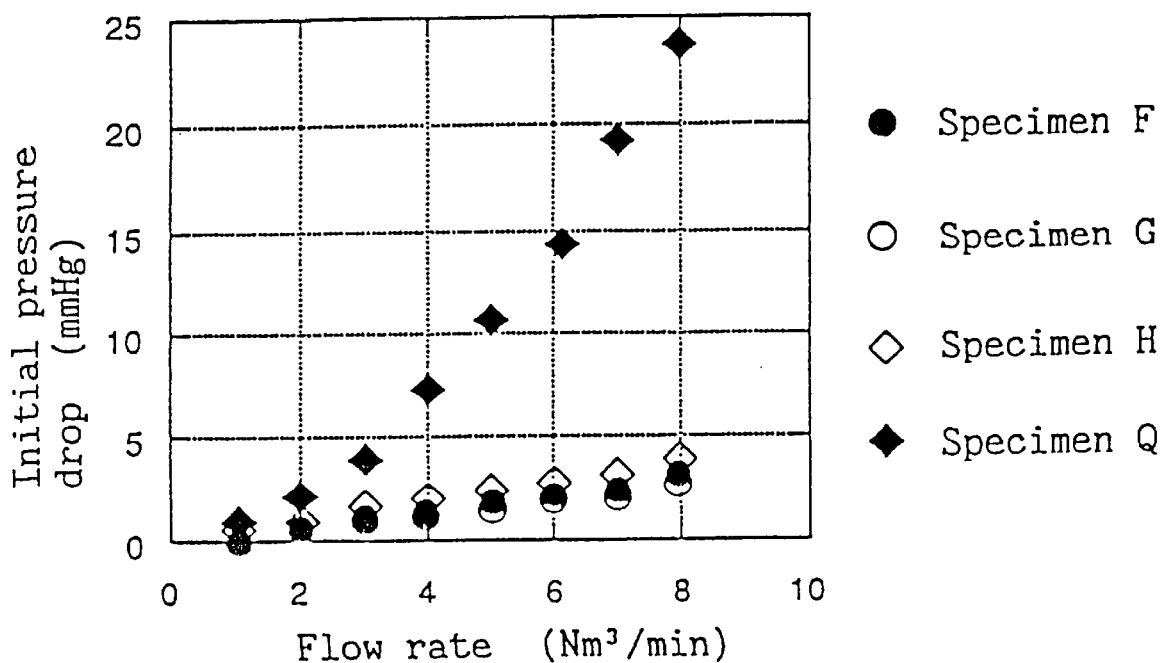
FIG. 18 is a graph showing the initial pressure drop for specimens F, G, H and Q.
Figure 19:
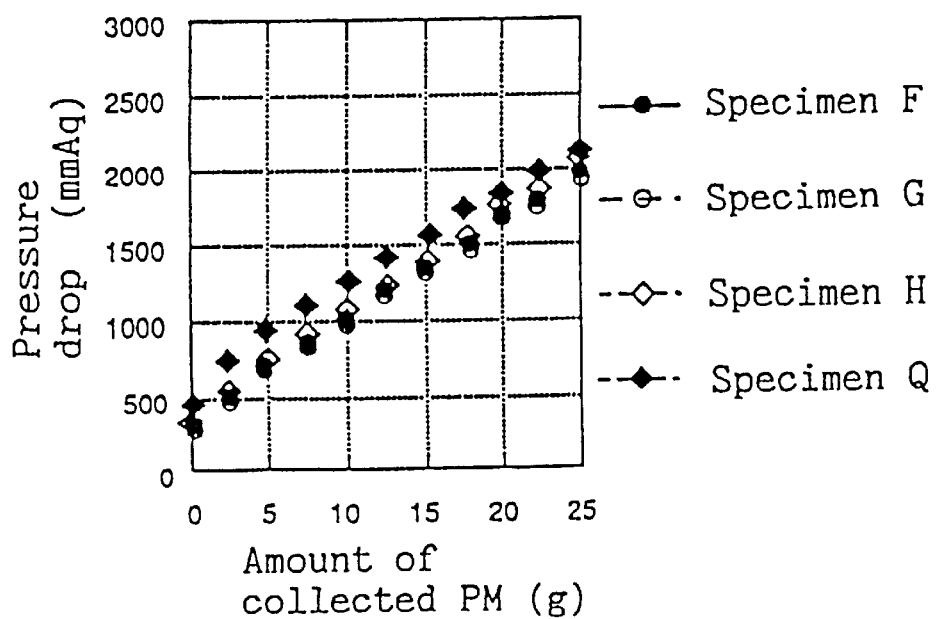
FIG. 19 is a graph showing the relationship between the pressure drop and the amount of particulates trapped for specimens F, G, H and Q.
Figure 20:
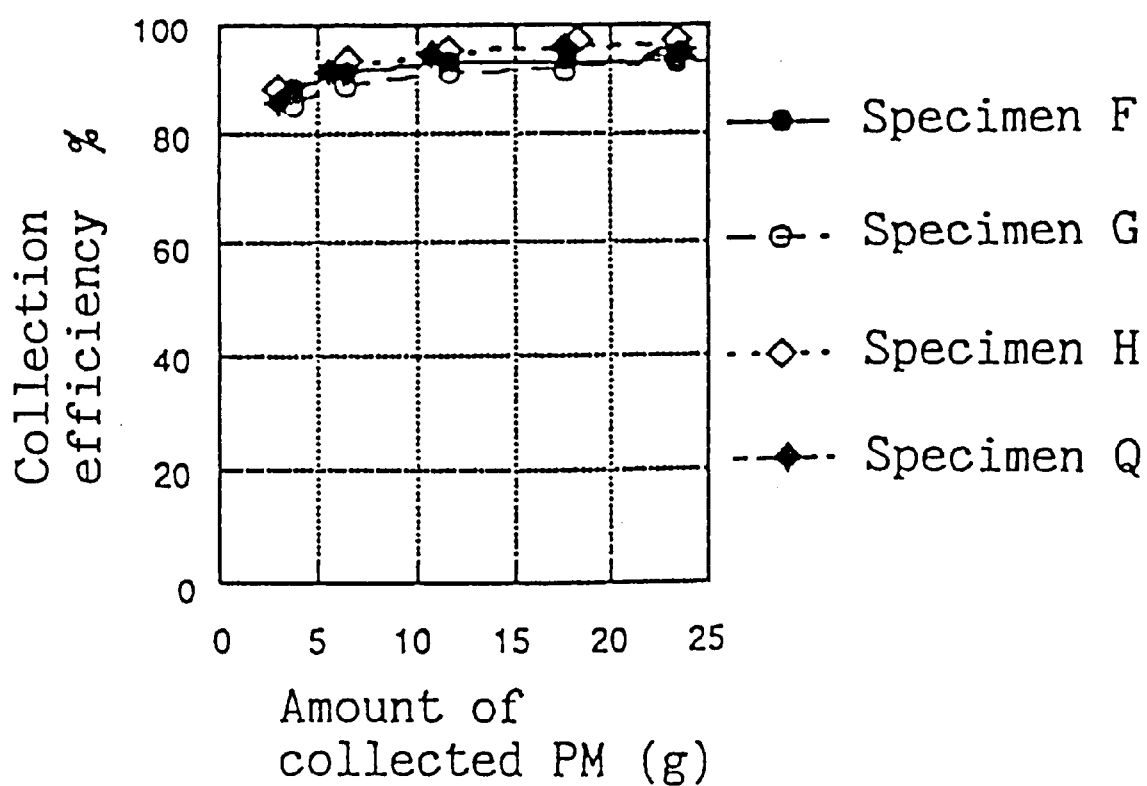
FIG. 20 is a graph showing the relationship between the particulate trapping efficiency and the amount of particulates trapped for specimens F, G, H and Q.

Particulate trapping efficiency and pressure drop were measured. The results are shown in FIGS. 18–20. As in Examples 1 and 2, the particulate trapping capacity was determined in terms of the relationships between the pressure drop and the amount of particulates trapped and between the particulate trapping efficiency and the amount of particulates trapped. As shown in FIG. 18, the specimens F, G and H were far lower in initial pressure drop than specimen Q, that is, a honeycomb type diesel particulate trap. As for particulate trapping capacity, specimens F, G and H were substantially equivalent to specimen Q and thus satisfactory.

Next, we measured the durability of each filter element when regenerating it under the same conditions as in Example 1. After repeating this regeneration test five times, the specimens were observed to check if they suffered any damage. The results of observation are shown in Table 8.

TABLE 8

|  | Regeneration test result |
| --- | --- |
| Specimen F (Invented) | Not broken |
| Specimen G (Invented) | Not broken |
| Specimen H (Invented) | Not broken |
| Specimen Q (Comparative) | Crack formed |

As shown in this table, specimens F, G and H suffered no damage at all, while specimen Q developed cracks.

Then, we measure SOF removing rates for specimens F, G and H. Exhausts kept at 250° C. and 350° C. were introduced. The results of measurement are shown in Table 9.

TABLE 7

| | Filter element | | | | | |
| --- | --- | --- | --- | --- | --- | --- |
| | Material | Material | Thickness | Packing density of collecting area | Filter area | Structure |
| Specimen F (Invented) | (1) Unwoven metal (fiber 20 μm dia) (2) Unwoven metal (fiber 100 μm dia) + γ-Al$_2$O$_3$ + Pt 2-layer | (1) Ni—Cr—Al (2) Ni—Cr—Al + γ-Al$_2$O$_3$ + Pt | 1.0 mm | 20% | 1.2 m$^2$ | FIG. 1 |
| Specimen G (Invented) | (1) Unwoven metal (fiber 20 μm dia) (2) Unwoven metal (fiber 100 μm dia) + γ-Al$_2$O$_3$ + Pt 2-layer | (1) Fe—Cr—Al (2) Fe—Cr—Al + γ-Al$_2$O$_3$ + Pt | 1.0 mm | 20% | 1.2 m$^2$ | FIG. 2 |
| Specimen H (Invented) | (1) Unwoven metal (fiber 20 μm dia) (2) Cermet #7 + γ-Al$_2$O$_3$ + Pt dia) 2-layer | (1) Ni—Cr—Al (2) Ni—Cr—al + γ-Al$_2$O$_3$ + Pt | 1.0 mm | 20% | 1.2 m$^2$ | FIG. 1 |
| Specimen Q (Comparative) | Cordierite | MgO—Al$_2$O$_3$—SiO$_2$ | 0.5 mm | 50% | 2.3 m$^2$ | |

TABLE 9

| | SOF removing rate (%) | |
|---|---|---|
| | Temperature 250° C. | Temperature 350° C. |
| Specimen F (Invented) | 40 | 50 |
| Specimen G (Invented) | 40 | 50 |
| Specimen H (Invented) | 40 | 50 |

As shown, the SOF concentration decreased by 40% or 50% by passing exhausts through specimen F, G or H, due to the catalytic action of Pt.

From these results, it is apparent that specimens F, G and H according to the present invention are substantially equivalent to a cordierite honeycomb trap in their particulate trapping capacity and pressure drop, while they are sufficiently low in initial pressure drop. Also, they showed good durability when burning particulates for regeneration. In short, the filter elements according to the present invention are excellent as diesel particulate traps. Moreover, since these filter elements are capable of removing SOF in exhausts, there is no need to provide a separate catalytic converter. Thus, by using the filter element according to the present invention, it is possible to reduce the mounting space and manufacturing cost of a diesel exhaust post-treatment device.

EXAMPLE 4

Figure 21A:
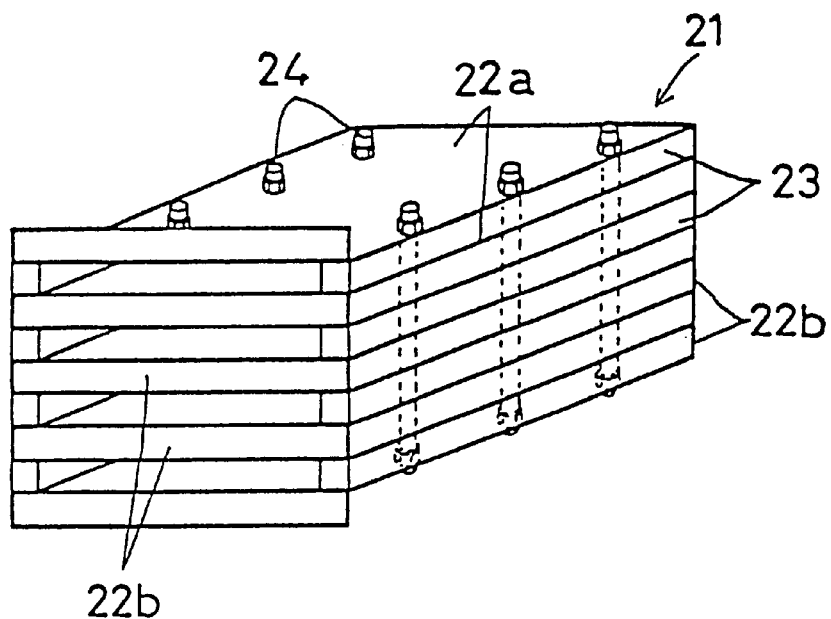
FIG. 21A is a perspective view of a filter element of the third embodiment.
Figure 21B:
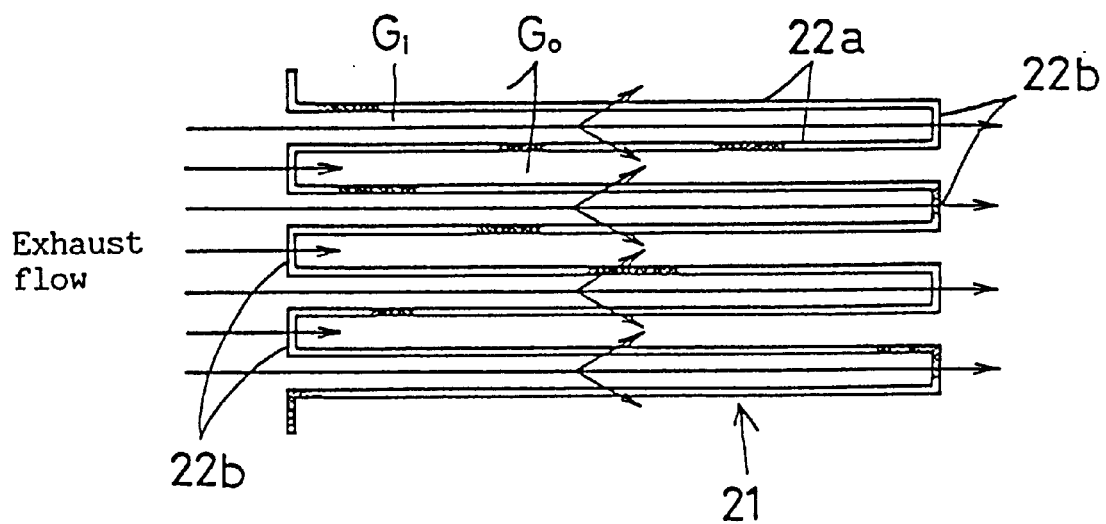
FIG. 21B is a sectional view of the same.
Figure 22A:
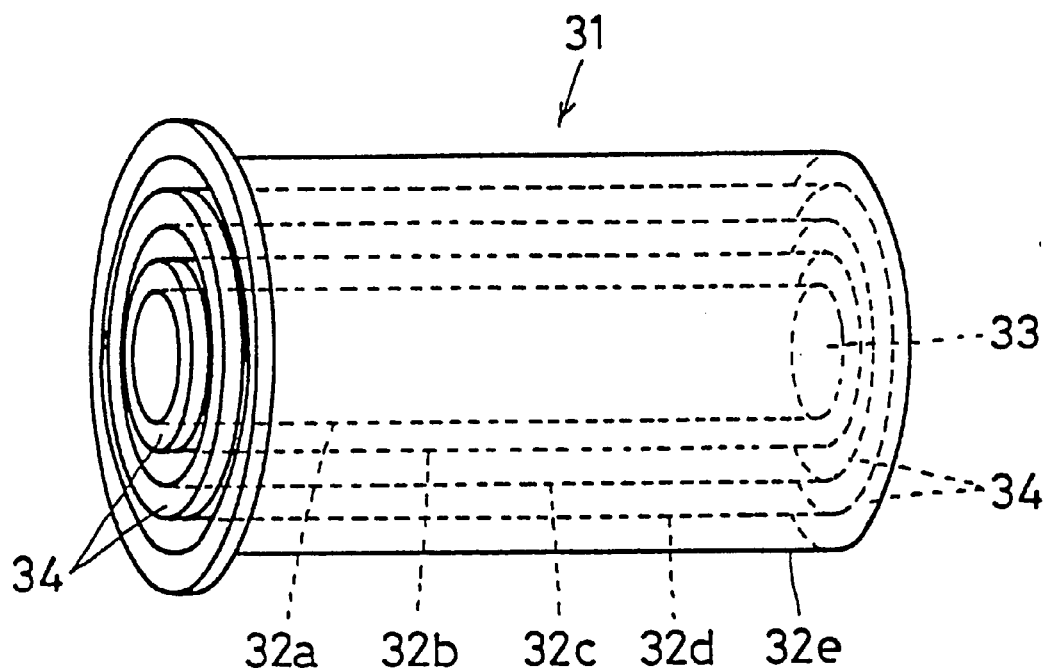
FIG. 22A is a perspective view of a filter element of the fourth embodiment.

FIGS. 21 and 22 show filter elements 21 and 31 manufactured in the manner as shown in FIGS. 3 and 5, respectively. The elements 21 and 31 shown in FIGS. 21 and 22 correspond to specimens I and J, respectively. The filter elements of both specimens I and J are formed from an Ni-based three-dimensionally reticulated porous material made by Sumitomo Electric Industries, Ltd (Trade name: Cermet). of these, specimen I is Ni—Cr-alloyed, while specimen J is Ni—Cr—Al-alloyed.

Figure 22B:
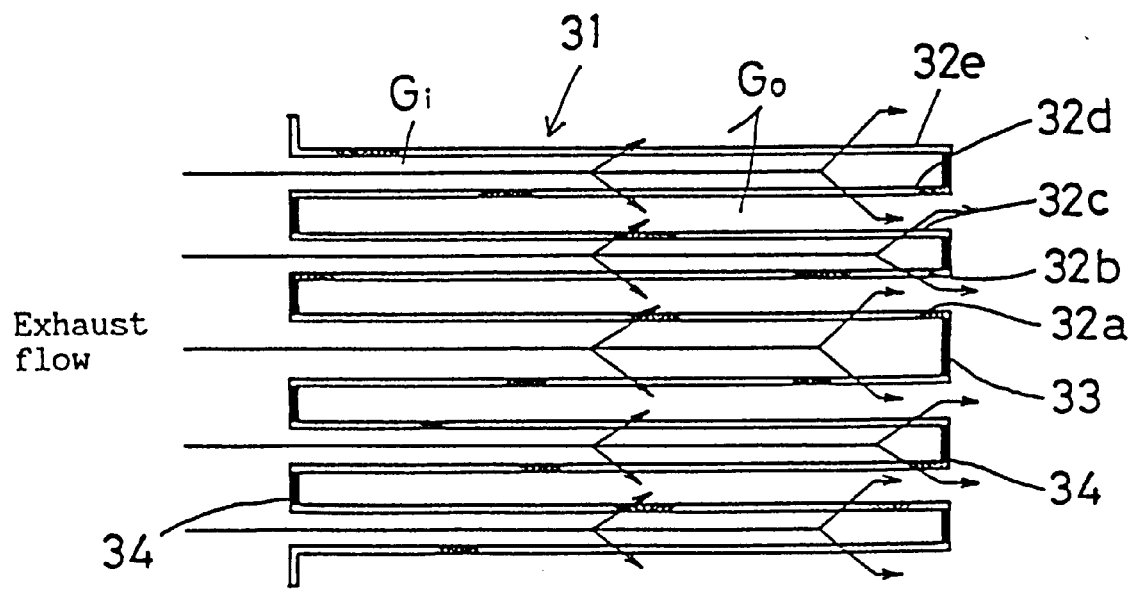
FIG. 22B is a sectional view of the same.

Each of the specimens I and J has an exhaust-incoming surface area of 1.2 m², and is mounted in a case having an internal volume of 2.5 liters. As shown in FIGS. 21B and 22B, exhausts introduced into the trap flow into the gaps Gi, which are provided alternately with the gaps Go, pass through all the filter members into the gaps Go, and are discharged from the trap. If their end plates are also formed of a filter material, exhaust will partially flow through them.

Specimens I and J may be formed from a metallic material other than those listed in the table, i.e. Fe—Cr—Al alloy and Ni—Cr—Al alloy.

For comparison purposes, we used the specimen Q used in Example 1, i.e. a cordierite honeycomb filter. This trap has a case 2.5 liter in internal volume, i.e. the same case as those accommodating specimens A and B.

Figure 23:
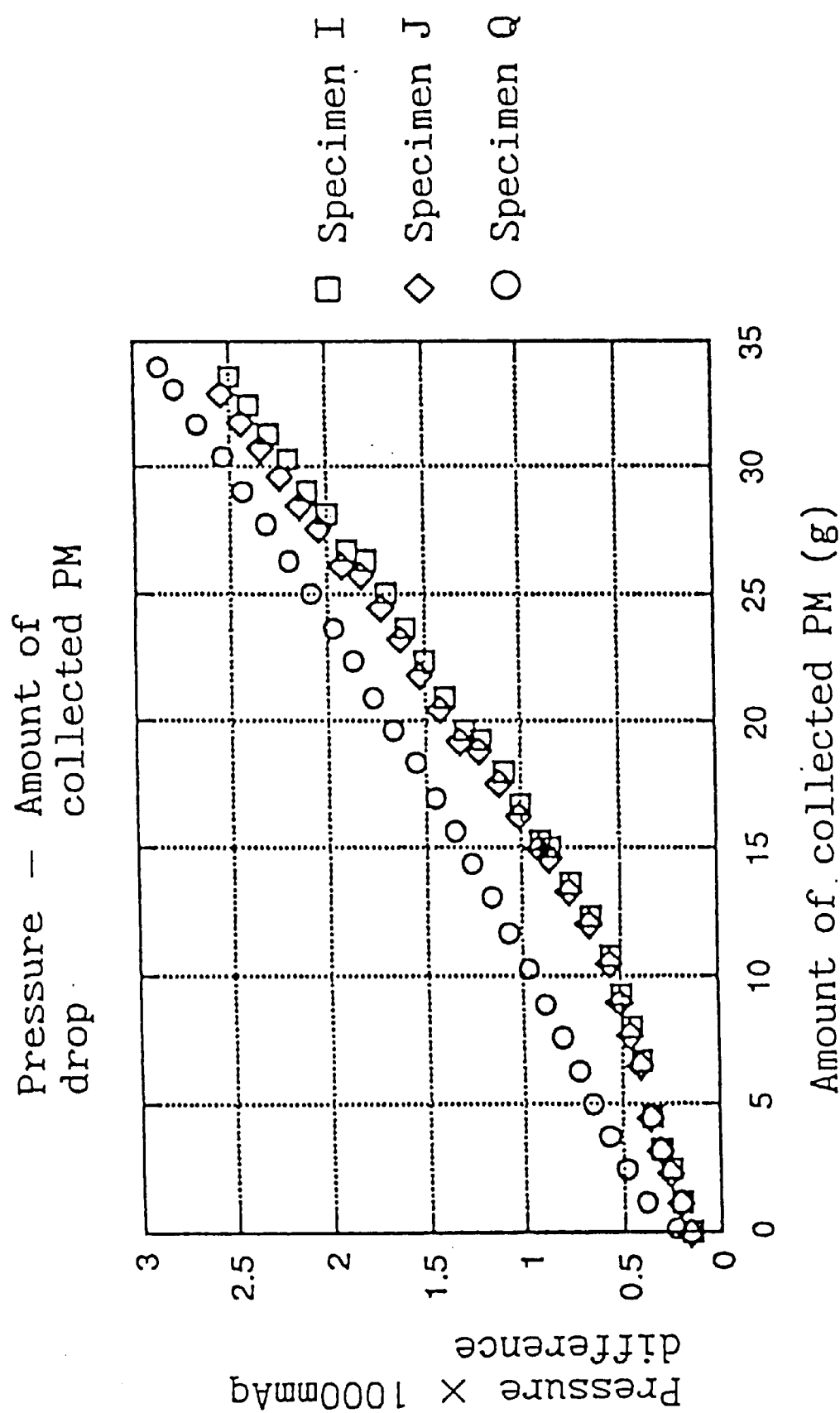
FIG. 23 is a graph showing the relationship between the pressure drop and the amount of particulates trapped for specimens I, J and Q.
Figure 24:
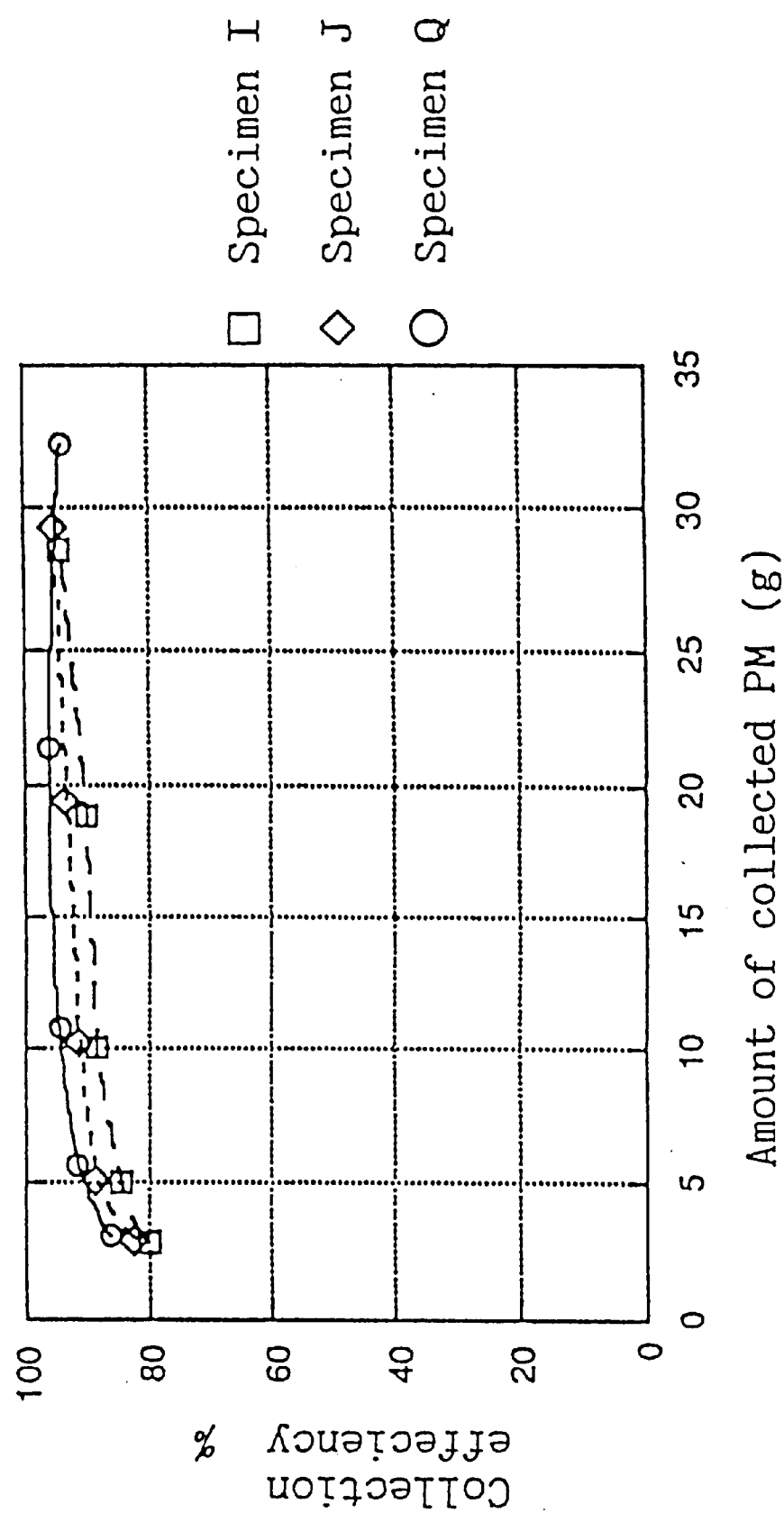
FIG. 24 is a graph showing the relationship between the particulate trapping efficiency and the amount of particulates trapped for specimens I, J and Q.

Particulate trapping efficiency and pressure drop were measured. The results are shown in FIGS. 23 and 24. FIGS. 23 and 24 show the relationships between the pressure drop and the amount of particulates trapped and between the particulate trapping efficiency and the amount of particulates trapped, respectively. As will be apparent from these figures, specimens I and J according to the present invention showed a particulate trapping capacity equivalent to a cordierite honeycomb filter element.

Next, we measured the durability of each filter element when regenerating it.

When 10 g of particulates were collected in each of the specimens I, J and Q on the test device of FIG. 11, the particulates collected were burnt by heating the exhausts. After repeating this particulate burning tests five times, the specimens were observed to check if they suffered any damage. The results are shown in Table 10. From these results, it is apparent that specimens I and J showed a higher regeneration durability than specimen Q, that is, a cordierite filter.

TABLE 10

| | Regeneration test result |
|---|---|
| Specimen I (Invented) | Not broken |
| Specimen J (Invented) | Not broken |
| Specimen Q (Comparative) | Crack formed |

From these results, it is apparent that specimens I and J according to the present invention are substantially equivalent in their particulate trapping capacity and pressure drop to a cordierite honeycomb type particulate trap. Also, they showed good durability when burning particulates for regeneration. In short, specimens I and J are excellent diesel particulate traps.

EXAMPLE 5

The particulate trap 200 comprising the filter element 21 or 31 shown in FIGS. 21 and 22 was mounted in the test devices shown in FIGS. 10 and 11. These filter elements correspond to specimens K, L and M in Table 11.

Each of the specimens K, L and M has an exhaust-incoming surface area of 1.2 m², and is mounted in a case having an internal volume of 2.5 liters. Each specimen is comprised of an NOx catalyst-carrying layer (302 in FIG. 7), a particulate-trapping layer (301 in FIG. 7), and another NOx catalyst-carrying layer (303 in FIG. 7). As shown in FIGS. 21B and 22B, exhaust introduced into the trap flows into the gaps Gi, which are provided alternately with the gaps Go, passes through filter members into the gaps Go, and is discharged from the trap. If their end plates are also formed of a filter material, the exhaust will partially flow through them.

A substrate of each NOx catalyst-carrying layer was formed of an Ni—Cr—Al-alloyed, Ni-based three-dimensionally reticulated porous material made by Sumitomo Electric Industries, Ltd (Trade name: Cermet). γ-alumina was applied to the surface of the substrate at a rate of 100 g/liter of metallic nonwoven fabric to form a catalyst-carrying coating layer. Cu as a catalyst was uniformly carried on the coating layer at a rate of 1.0 g/liter.

Specimens K, L and M may be formed from a metallic material other than those listed in the table, i.e. Fe—Cr—Al alloy and Ni—Cr—Al alloy.

For comparison purposes, we used the specimen Q having a cordierite honeycomb trap. This trap has a case 2.5 liter in internal volume, i.e. the same case as in the specimens K, L and M.

TABLE 11

| | Filter element | | | | | |
|---|---|---|---|---|---|---|
| | Material | Material | Thickness | Packing density of collecting area | Filter area | Structure |
| Specimen K (Invented) | (1) Unwoven metal (fiber 100 μm dia) + γ-Al$_2$O$_3$ + Cu<br>(2) Unwoven metal (fiber 20 μm dia)<br>(3) Unwoven metal (fiber 100 μm dia) + γ-Al$_2$O$_3$ + Cu<br>3-layer | (1) Ni—Cr—Al + γ-Al$_2$O$_3$ + Cu<br>(2) Ni—Cr—Al +<br>(3) Ni—Cr—Al + γ-Al$_2$O$_3$ + Cu | 1.5 mm | 20% | 1.2 m$^2$ | FIG. 22 |
| Specimen L (Invented) | (1) Unwoven metal (fiber 100 μm dia) + γ-Al$_2$O$_3$ + Cu<br>(2) Unwoven metal (fiber 20 μm dia)<br>(3) Unwoven metal (fiber 100 μm dia) + γ-Al$_2$O$_3$ + Cu<br>3-layer | (1) Fe—Cr—Al + γ-Al$_2$O$_3$ + Cu<br>(2) Fe—Cr—Al<br>(3) Fe—Cr—Al + γ-Al$_2$O$_3$ + Cu | 1.5 mm | 20% | 1.2 m$^2$ | FIG. 21 |
| Specimen M (Invented) | (1) Cermet #7* + γ-Al$_2$O$_3$ + Cu<br>(2) Unwoven metal (fiber 20 μm dia)<br>(3) Cermet #7 + γ-Al$_2$O$_3$ + Cu<br>3-layer | (1) Ni—Cr—Al + γ-Al$_2$O$_3$ + Cu<br>(2) Ni—Cr—Al<br>(3) Ni—Cr—Al + γ-Al$_2$O$_3$ + Cu | 1.5 mm | 20% | 1.2 m$^2$ | FIG. 22 |
| Specimen Q (Comparative) | Cordierite | MgO—Al$_2$O$_3$-SiO$_2$ | 0.5 mm | 50% | 2.3 m$^2$ | |

*Cermet is the product of Sumitomo Electric Industries Co. which is a 3-dimensional reticular structure.
7 is model number. It indicates that the number of cells is 50–70 per inch.

Figure 25:
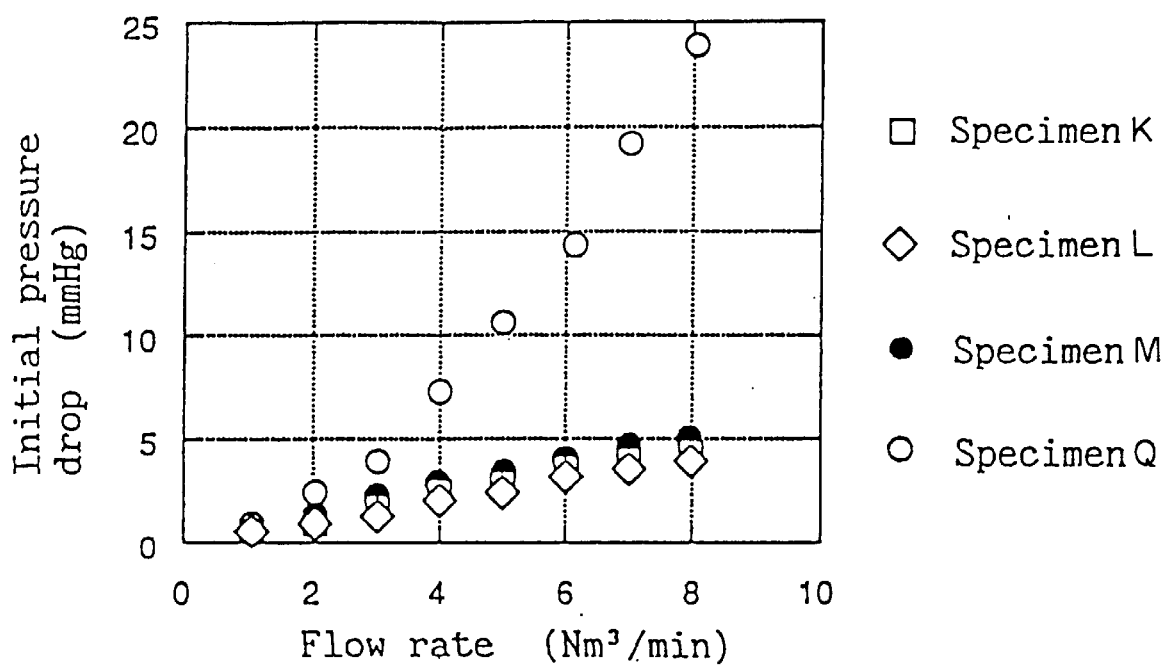
FIG. 25 is a graph showing the initial pressure drop for specimens K, L, M and Q.
Figure 26:
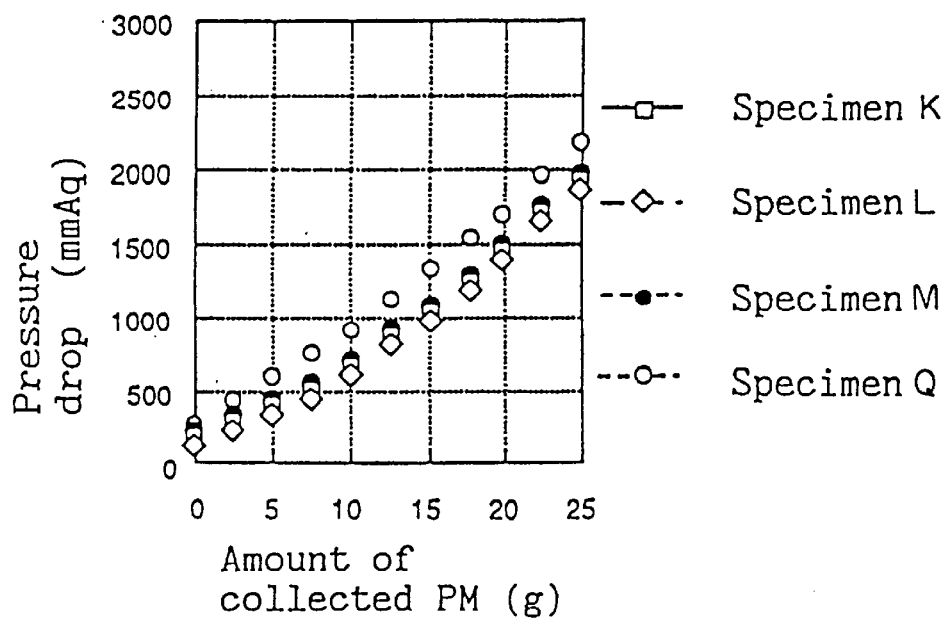
FIG. 26 is a graph showing the relationship between the pressure drop and the amount of particulates trapped for specimens K, L, M and Q.
Figure 27:
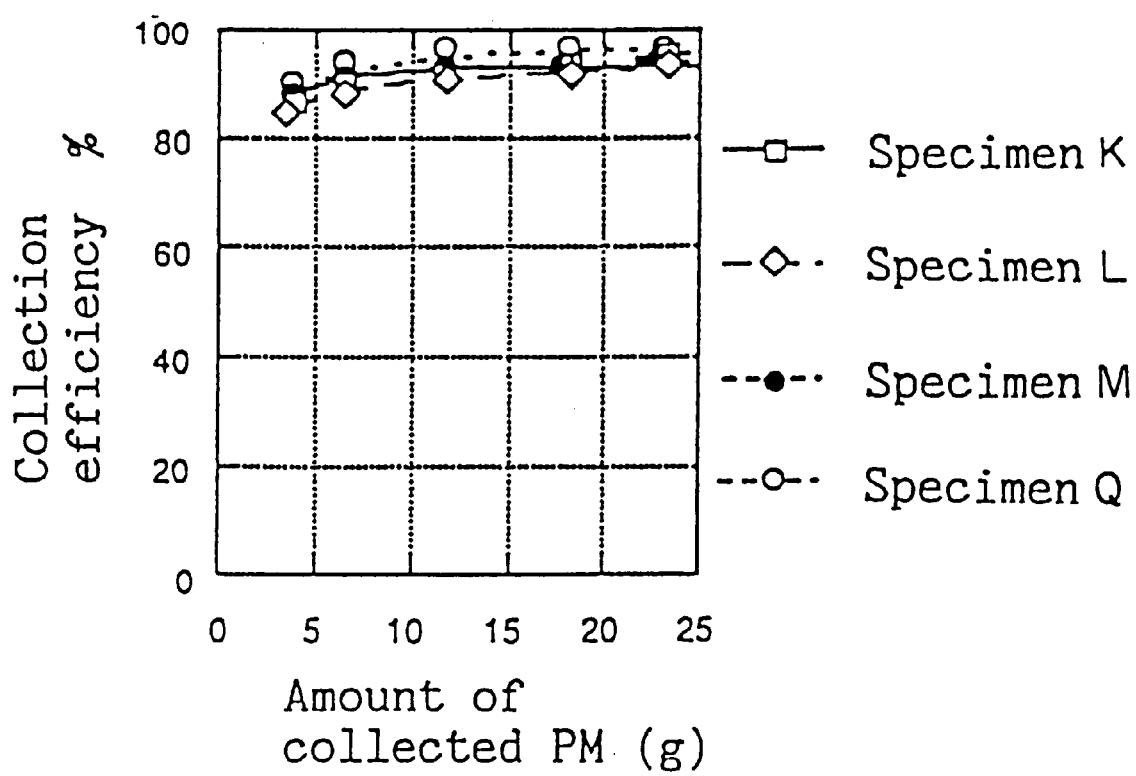
FIG. 27 is a graph showing the relationship between the particulate trapping efficiency and the amount of particulates trapped for specimens K, L, M and Q.

Particulate trapping efficiency and pressure drop were measured. The results are shown in FIGS. 25 to 27, which show the relationship between the pressure drop and the amount of particulates trapped and between the particulate trapping efficiency and the amount of particulates trapped. As will be apparent from these figures, specimens K, L and M according to the present invention were lower in the initial pressure drop than the specimen Q, which is a diesel particulate trap having a honeycomb-like structure. Further, they showed as high a particulate trapping capacity as the honeycomb type particulate trap.

Next, we tested the durability of each filter element when regenerating it, using the test device shown in FIG. 11. In this test, when 10 g of particulates were collected in each of the specimens K, L, M and Q, the particulates were burned by heating the exhausts. After repeating this particulate burning treatment five times, the specimens were observed to check if they suffered any damage. The results are shown in Table 12. From these results, it is apparent that specimens K, L and M showed a higher regeneration durability than specimen Q, or a cordierite filter.

TABLE 12

| | Regeneration test result |
|---|---|
| Specimen K (Invented) | Not broken |
| Specimen L (Invented) | Not broken |
| Specimen M (Invented) | Not broken |
| Specimen Q (Comparative) | Crack formed |

Then, we measured NO removing rates for specimens K, L and M. In this test, C$_2$H$_4$ as a reducing agent was introduced into exhausts. Exhausts were introduced under the conditions shown in Table 13.

TABLE 13

| Item | Condition |
|---|---|
| NO concentration in exhausts | 1000 ppm |
| C$_2$H$_4$ concentration in exhausts | 250 ppm |
| O$_2$ concentration in exhausts | 2% |
| Exhaust temperature | 250° C. |

After maintaining exhausts at 250° C. for two minutes, their NO concentration was measured. FIG. 14 shows the average NO concentration.

TABLE 14

| | NO concentration |
|---|---|
| Specimen K (Invented) | 500 ppm |
| Specimen L (Invented) | 500 ppm |
| Specimen M (Invented) | 500 ppm |

As shown, the NO concentration decreased by half by passing exhausts through specimens K, L or M due to the action of the Cu catalyst.

From these results, it is apparent that specimens k, L and M according to the present invention are substantially equivalent to a cordierite honeycomb filter in their particulate trapping capacity and pressure drop, while they are sufficiently low in initial pressure drop. Also, they showed high durability when burning particulates for regeneration. In short, specimens according to the present invention are excellent diesel particulates traps. Moreover, since these filter elements are capable of removing NO in exhausts, there is no need to provide a separate catalytic converter. Thus, by using the filter element according to the present invention, it is possible to reduce the mounting space and the manufacturing cost of a diesel exhaust post-treatment device.

EXAMPLE 6

The particulate trap 200 comprising the filter element 21 or 31 shown in FIGS. 21 and 22 was mounted in the test devices shown in FIGS. 10 and 11. These filter elements 21 and 31 correspond to specimens N, O and P in Table 15.

Each of the specimens N, O and P has an exhaust-incoming surface area of 1.2 $m^2$, and is mounted in a case having an internal volume of 2.5 liters. Each specimen is comprised of a particulate-trapping layer (301 in FIG. 7) and an SOF catalyst-carrying layer (303 in FIG. 7). As shown in FIGS. 21B and 22B, exhaust introduced into the trap flows into the gaps Gi, which are provided alternately with the gaps Go, passes through filter members into the gaps Go, and is discharged from the trap. If their end plates are also formed of a filter material, the exhaust will partially flow through them.

A substrate of the SOF catalyst-carrying layer was formed of an Ni—Cr—Al-alloyed, Ni-based three-dimensionally reticulated porous material made by Sumitomo Electric Industries, Ltd. (Trade name: Cermet). γ-alumina was applied to the surface of the substrate at a rate of 100 g/liter of porous member to form the catalyst-carrying coating layer. Pt as a catalyst was uniformly carried on the coating layer at a rate of 1.0 g/liter.

Specimens N, O and P may be formed from a metallic material other than those listed in the table, i.e. Fe—Cr—Al alloy and Ni—Cr—Al alloy.

For comparison purposes, we used the specimen Q which is a cordierite honeycomb trap. This trap has a case 2.5 liter in internal volume, i.e. the same case as those accommodating specimens N, O and P.

Figure 28:
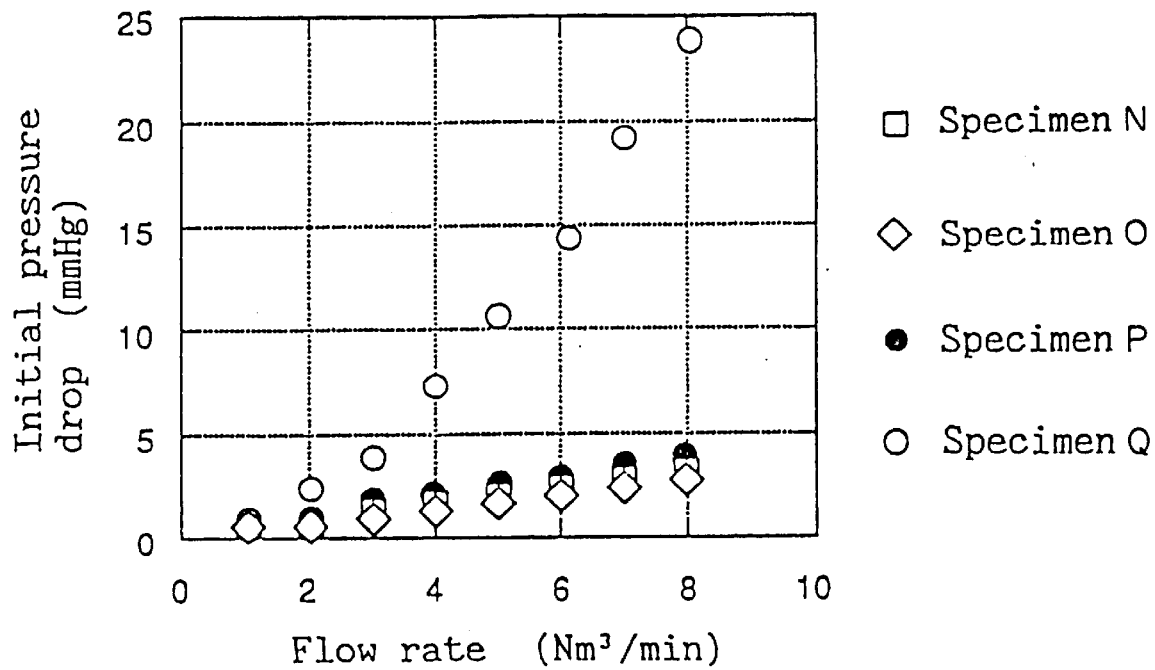
FIG. 28 is a graph showing the initial pressure drop for specimens N, O, P and Q.
Figure 29:
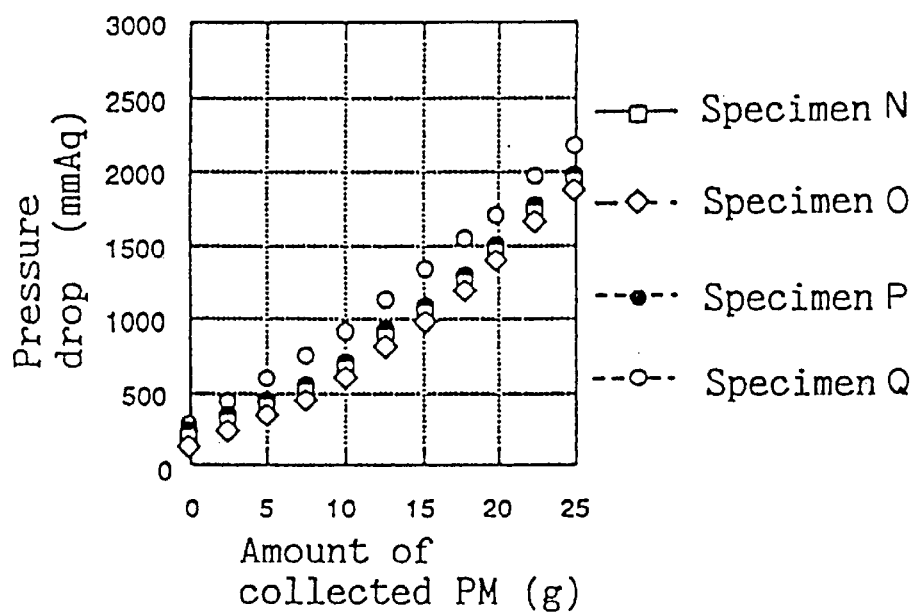
FIG. 29 is a graph showing the relationship between the pressure drop and the amount of particulates trapped for specimens N, O, P and Q.
Figure 30:
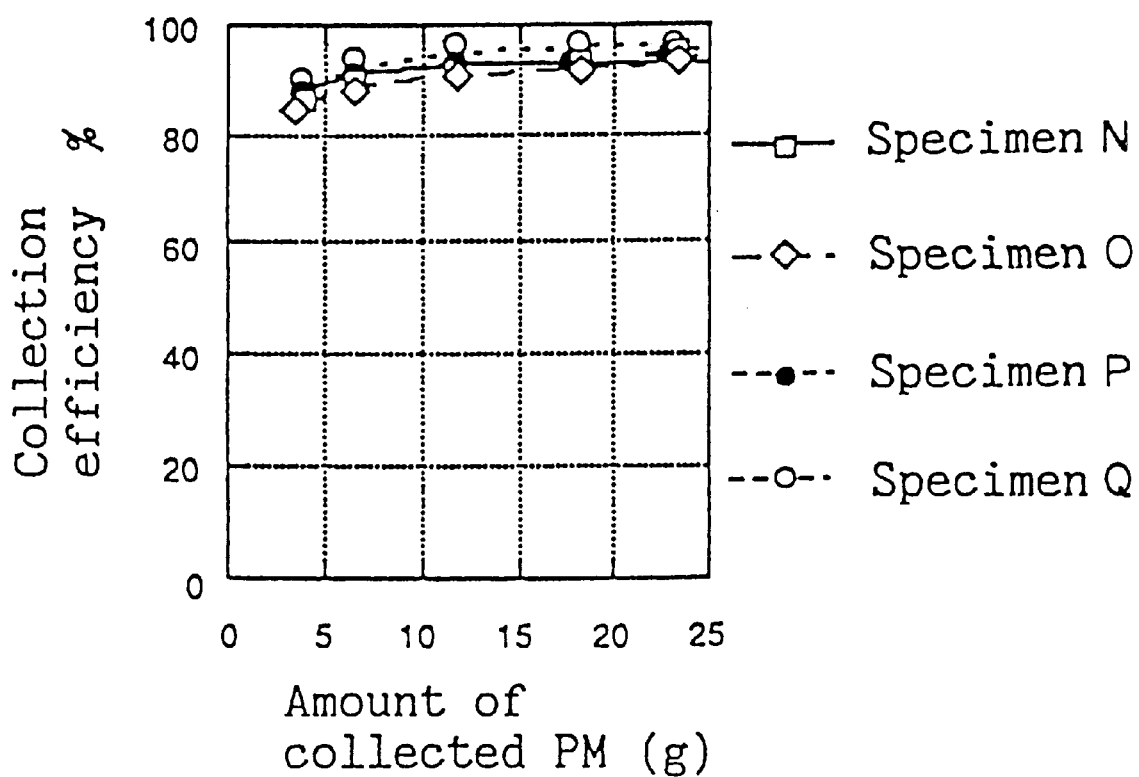
FIG. 30 is a graph showing the relationship between the particulate trapping efficiency and the amount of particulates trapped for specimens N, O, P and Q.

Particulate trapping efficiency and pressure drop were measured. The results are shown in FIGS. 28 to 30, which show the relationship between the pressure drop and the amount of particulates trapped and between the particulate trapping efficiency and the amount of particulates trapped. As will be apparent from these figures, specimens N, O and P according to the present invention were lower in the initial pressure drop than the specimen Q, which is a diesel particulate trap having a honeycomb-like structure. Further, they showed as high a particulate trapping capacity as the honeycomb type particulate trap.

Next, we tested the durability of each filter element when regenerating it, using the test device shown in FIG. 11. In this test, when 10 g of particulates were collected in each of the specimens N, O, P and Q, the particulates were burned by heating the exhausts. After repeating this particulate burning treatment five times, the specimens were observed to check if they suffered any damage. The results are shown in Table 16. From these results, it is apparent that specimens N, O and P showed a higher regeneration durability than specimen Q, that is, a cordierite filter.

TABLE 16

|  | Regeneration test result |
| --- | --- |
| Specimen N (Invented) | Not broken |
| Specimen O (Invented) | Not broken |
| Specimen P (Invented) | Not broken |
| Specimen I (Comparative) | Crack formed |

Then, we measured SOF removing rates for specimens N, O and P. Exhausts kept at 250° C. and 350° C. were introduced. The results of measurement are shown in Table 17.

TABLE 15

| | Filter element | | | | | |
| --- | --- | --- | --- | --- | --- | --- |
| | Material | Material | Thickness | Packing density of collecting area | Filter area | Structure |
| Specimen N (Invented) | (1) Unwoven metal (fiber 20 μm dia) (2) Unwoven metal (fiber 100 μm dia) + γ-Al₂O₃ + Pt 2-layer | (1) Ni—Cr—Al (2) Ni—Cr—Al + γ-Al₂O₃ + Pt | 1.0 mm | 20% | 1.2 $m^2$ | FIG. 22 |
| Specimen O (Invented) | (1) Unwoven metal (fiber 20 μm dia) (2) Unwoven metal (fiber 100 μm dia) γ-Al₂O₃ + Pt 2-layer | (1) Fe—Cr—Al (2) Fe—Cr—Al + γ-Al₂O₃ + Pt | 1.0 mm | 20% | 1.2 $m^2$ | FIG. 21 |
| Specimen P (Invented) | (1) Unwoven metal (fiber 20 μm dia) (2) Cermet #7 + γ-Al₂O₃ + Pt dia) 2-layer | (1) Ni—Cr—Al (2) Ni—Cr—Al + γ-Al₂O₃ + Pt | 1.0 mm | 20% | 1.2 $m^2$ | FIG. 22 |
| Specimen Q (Comparative) | Cordierite | MgO—Al₂O₃—SiO₂ | 0.5 mm | 50% | 2.3 $m^2$ | |

*Cermet is the product of Sumitomo Electric Industries Co. which is a 3-dimensional reticular structure.
7 is model number. It indicates that the number of cells is 50–70 per inch.

TABLE 17

|  | SOF removing rate (%) | |
| --- | --- | --- |
|  | Temperature 250° C. | Temperature 350° C. |
| Specimen N (Invented) | 40 | 50 |
| Specimen O (Invented) | 40 | 50 |
| Specimen P (Invented) | 40 | 50 |

As shown, the SOF concentration decreased by 40% or 50% by passing exhausts through specimen N, O or P.

From these results, it is apparent that specimens N, O and P according to the present invention are substantially equivalent to a cordierite honeycomb filter in their particulate trapping capacity and pressure drop, while they are sufficiently low in initial pressure drop. Also, they showed good durability when burning particulates for regeneration. In short, the filter elements according to the present invention are excellent diesel particulates traps. Moreover, since these filter elements are capable of removing SOF in exhausts, there is no need to provide a separate catalytic converter. Thus, by using the filter element according to the present invention, it is possible to reduce the mounting space and the manufacturing cost of a diesel exhaust post-treatment device.

The particulate trap according to the present invention is small in size, though its filters have a large surface area. It can trap particulates with high efficiency while keeping the pressure drop to minimum. Since its filters are made of a metal, it shows high durability during regeneration. All in all, this particulate trap meets every requirement as a particulate trap for use in a diesel engine, and will be of great help in preventing air pollution resulting from particulates contained in diesel engine emissions.

By growing alumina whiskers on the substrate of the filter formed from a nonwoven fabric of metal fiber, it is possible to reduce the size of the filter pores. This enables the filter to catch air-borne particulates whose diameters are less than 2 μm.

By providing the filter element with a catalyst-carrying, three-dimensionally reticulated metallic porous member on one or either side thereof, the particulate trap can be used as a catalytic converter too. Thus, there is no need to provide a separate catalytic converter. This makes it possible to cut down the size and manufacturing cost of the exhaust post-treatment device. Since the filter substrate has a small heat capacity, the catalyst can be activated quickly and reliably, so that it can effectively clean the environment.

What is claimed is:

1. A particulate trap for use with a diesel engine, comprising a filter element disposed in an exhaust line of the diesel engine and having an exhaust inlet end and an exhaust outlet end, said filter element comprising a plurality of tapered tubular filter members made of a nonwoven web of heat-resistant metal fiber each having a first end and a second end, said second end having a greater diameter than said first end, said plurality of tapered tubular filter members being concentrically nested such that adjacent ones of said plurality of tapered tubular filter members taper in opposite directions, said first end of each of said plurality of tapered tubular filter members which has another of said plurality of tapered tubular filter members provided immediately thereinside having the same diameter as said second end of the other of said plurality of tapered tubular filter members provided immediately thereinside, an innermost of said plurality of tapered tubular filter members having said first end thereof closed, and direct connections between said first end of each of said plurality of tapered tubular filter members having another of said plurality of tapered tubular filter members provided immediately thereinside and said second ends of the other of said plurality of tapered tubular filter members provided immediately thereinside such that gaps between adjacent ones of said plurality of tapered tubular filter members are alternately closed at said exhaust inlet end and at said exhaust outlet end;

wherein each of said tapered tubular filter members comprises a filter material having on at least one side thereof a three-dimensionally reticulated porous member made of a heat resistant metal having continuous pores, said porous member carrying a catalyst.

2. The particulate trap of claim 1, wherein each of said tapered tubular filter members has a circular section.

3. A particulate trap for use with a diesel engine, comprising a filter element having an exhaust inlet end and an exhaust outlet end, said filter element comprising a plurality of tapered tubular filter members made of a nonwoven web of heat-resistant metal fiber each having a first end and a second end, said second end having a greater diameter than said first end, said plurality of tapered tubular filter members being concentrically nested such that adjacent ones of said plurality of tapered tubular filter members taper in opposite directions, said first end of each of said plurality of tapered tubular filter members which has another of said plurality of tapered tubular filter members provided immediately thereinside having the same diameter as said second end of the other of said plurality of tapered tubular filter members provided immediately thereinside, an innermost of said plurality of tapered tubular filter members having said first end thereof closed, and direct connections between said first end of each of said plurality of tapered tubular filter members having another of said plurality of tapered tubular filter members provided immediately thereinside and said second ends of the other of said plurality of tapered tubular filter members provided immediately thereinside such that gaps between adjacent ones of said plurality of tapered tubular filter members are alternately closed at said exhaust inlet end and at said exhaust outlet end;

wherein each of said tapered tubular filter members comprises a filter material having on at least one side thereof a three-dimensionally reticulated porous member made of a heat resistant metal having continuous pores, said porous member carrying a catalyst.

4. The particulate trap of claim 3, wherein each of said tapered tubular filter members has a circular section.

* * * * *